United States Patent
Agiwal et al.

(10) Patent No.: US 9,787,442 B2
(45) Date of Patent: Oct. 10, 2017

(54) METHOD AND SYSTEM FOR PERFORMING HYBRID AUTOMATIC REPEAT REQUEST OPERATION IN AN ASYMMETRIC MULTICARRIER COMMUNICATION NETWORK ENVIRONMENT

(71) Applicant: Samsung Electronics Co., Ltd., Gyeonggi-do (KR)

(72) Inventors: Anil Agiwal, Bangalore (IN); Anshuman Nigam, Bangalore (IN); Young-Bin Chang, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 68 days.

(21) Appl. No.: 14/426,355

(22) PCT Filed: Sep. 5, 2013

(86) PCT No.: PCT/KR2013/008014
§ 371 (c)(1),
(2) Date: Mar. 5, 2015

(87) PCT Pub. No.: WO2014/038863
PCT Pub. Date: Mar. 13, 2014

(65) Prior Publication Data
US 2015/0215082 A1    Jul. 30, 2015

(30) Foreign Application Priority Data

Sep. 5, 2012   (IN) ............... 3680/CHE/2012
Aug. 30, 2013  (IN) ............... 3680/CHE/2012

(51) Int. Cl.
H04L 5/00      (2006.01)
H04L 1/18      (2006.01)
H04W 72/04     (2009.01)

(52) U.S. Cl.
CPC .......... H04L 1/1887 (2013.01); H04L 1/1812 (2013.01); H04L 1/1822 (2013.01);
(Continued)

(58) Field of Classification Search
CPC ..... H04L 5/001; H04L 5/0055; H04L 1/1822; H04L 1/1864; H04L 1/1896;
(Continued)

(56) References Cited

U.S. PATENT DOCUMENTS 7,783,949 B2 *  8/2010  Lohr et al. .................... 714/751
9,131,501 B2 *  9/2015  Gonsa ................. H04B 7/2606
(Continued)

FOREIGN PATENT DOCUMENTS

KR   10-2012-0061504    6/2012
WO   WO 2008/030798 A2  3/2008
WO   WO 2011/022482 A1  2/2011

OTHER PUBLICATIONS

International Search Report dated Dec. 23, 2013 in connection with International Patent Application No. PCT/KR2013/008014, 4 pages.
(Continued)

Primary Examiner — Ayaz Sheikh
Assistant Examiner — Debebe Asefa

(57) ABSTRACT

The present invention provides a method and system for performing Hybrid Automatic Repeat Request (HARQ) operation in an asymmetric multicarrier communication network environment. In one embodiment, a method includes receiving resource allocation information from a base station in a scheduling interval of a first carrier, where the resource allocation information indicates resources and transmit time interval in an uplink allocation interval. The method includes transmitting the HARQ packet to the base station in the transmit time interval of the uplink allocation interval on the second carrier if the transmit time interval
(Continued)

corresponds to a first partition of the uplink allocation interval. If the transmit time interval corresponds to a second partition of the uplink allocation interval, the method further includes transmitting the HARQ packet to the base station in the transmit time interval of the uplink allocation interval on the second carrier according to a second type of HARQ process.

30 Claims, 23 Drawing Sheets

(52) U.S. Cl.
CPC .......... *H04L 1/1893* (2013.01); *H04L 5/0007* (2013.01); *H04W 72/0413* (2013.01); *H04W 72/0446* (2013.01)

(58) Field of Classification Search
CPC .. H04L 1/1825; H04L 1/1835; H04W 72/042; H04W 72/0413; H04W 72/0406; H04W 72/04
See application file for complete search history.

(56) References Cited

U.S. PATENT DOCUMENTS

| 2010/0142494 | A1 | 6/2010 | Hsu |
| 2010/0192035 | A1 | 7/2010 | Sagfors et al. |
| 2013/0051269 | A1* | 2/2013 | Suzuki ................ H04L 1/1812 370/252 |

OTHER PUBLICATIONS

Written Opinion of International Searching Authority dated Dec. 23, 2013 in connection with International Patent Application No. PCT/KR2013/008014, 5 pages.

* cited by examiner

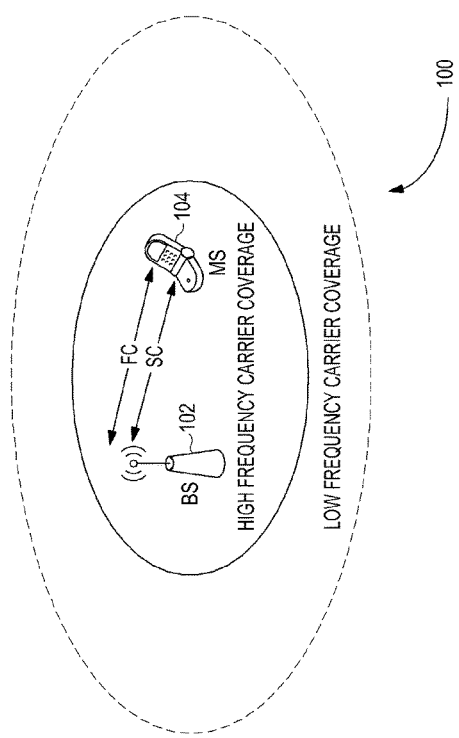
[Fig. 1a]

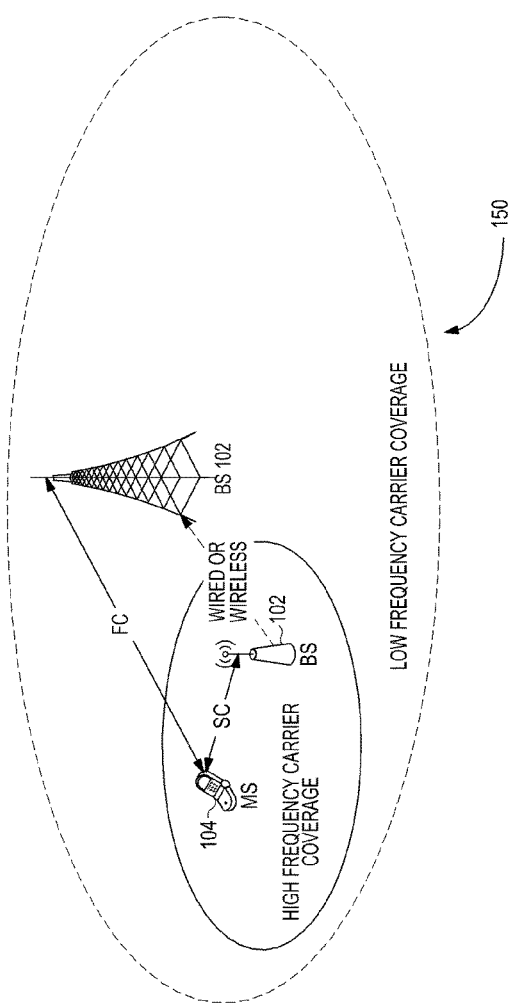
[Fig. 1b]

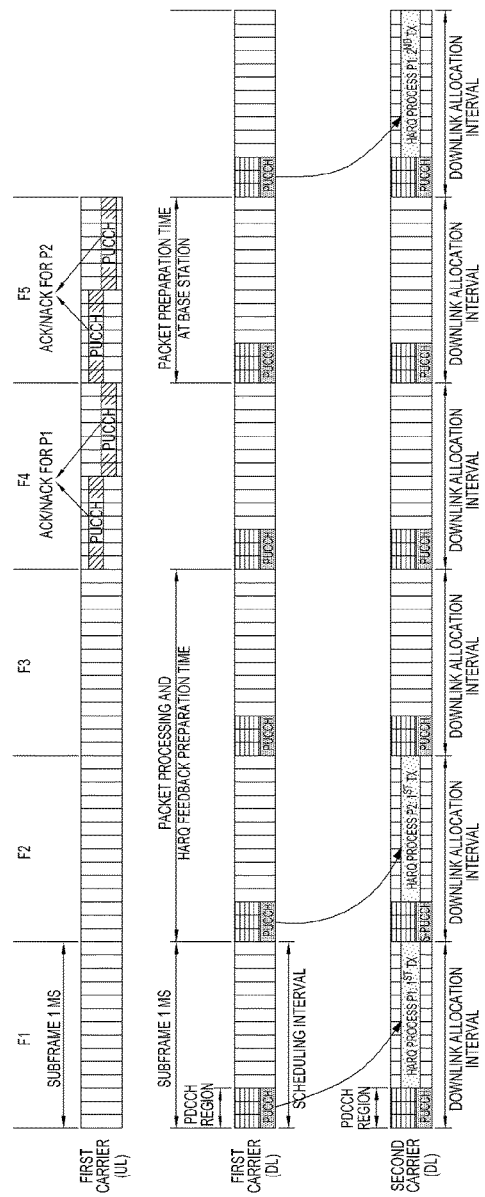
[Fig. 1c]

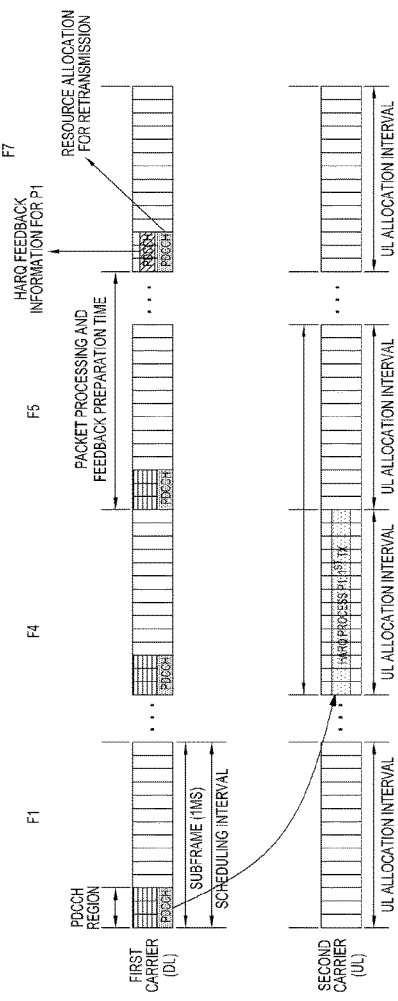
[Fig. 1d]

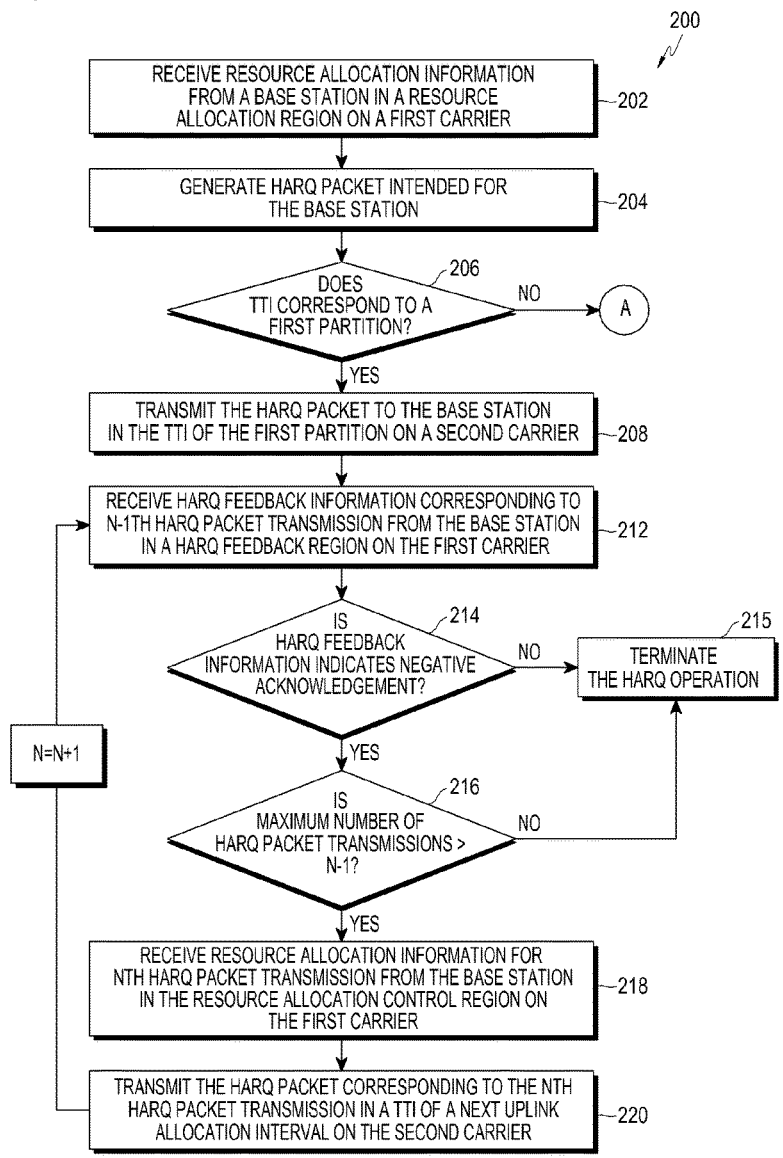
[Fig. 2a]

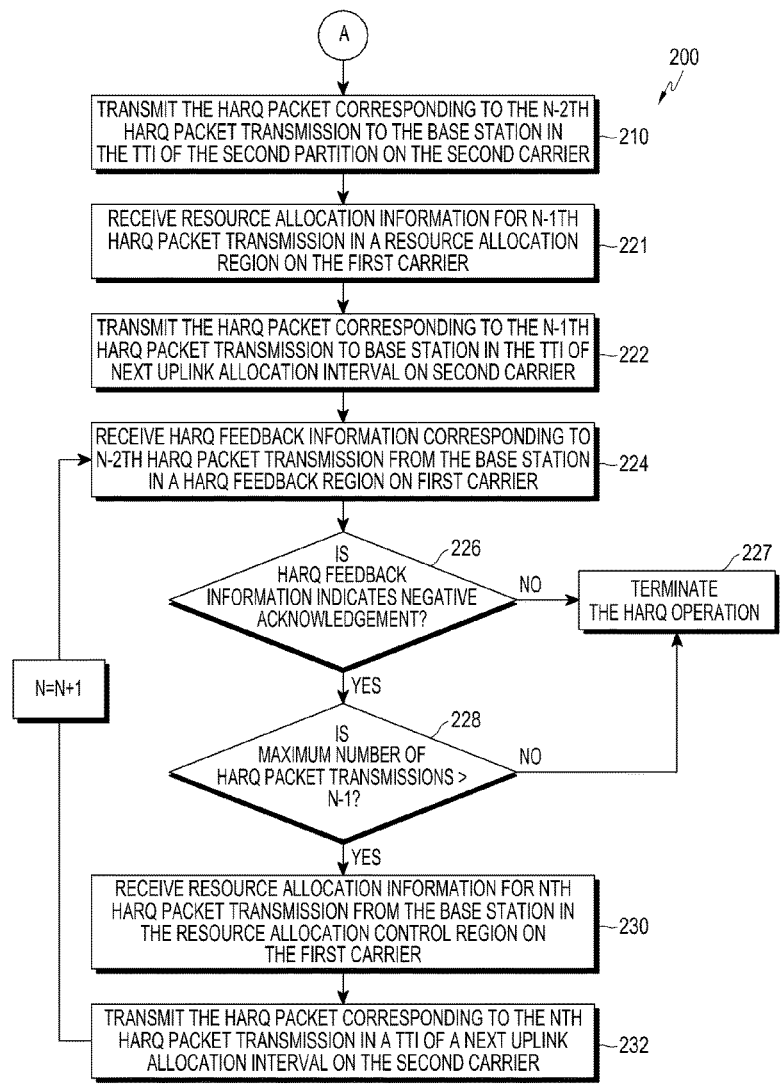
[Fig. 2b]

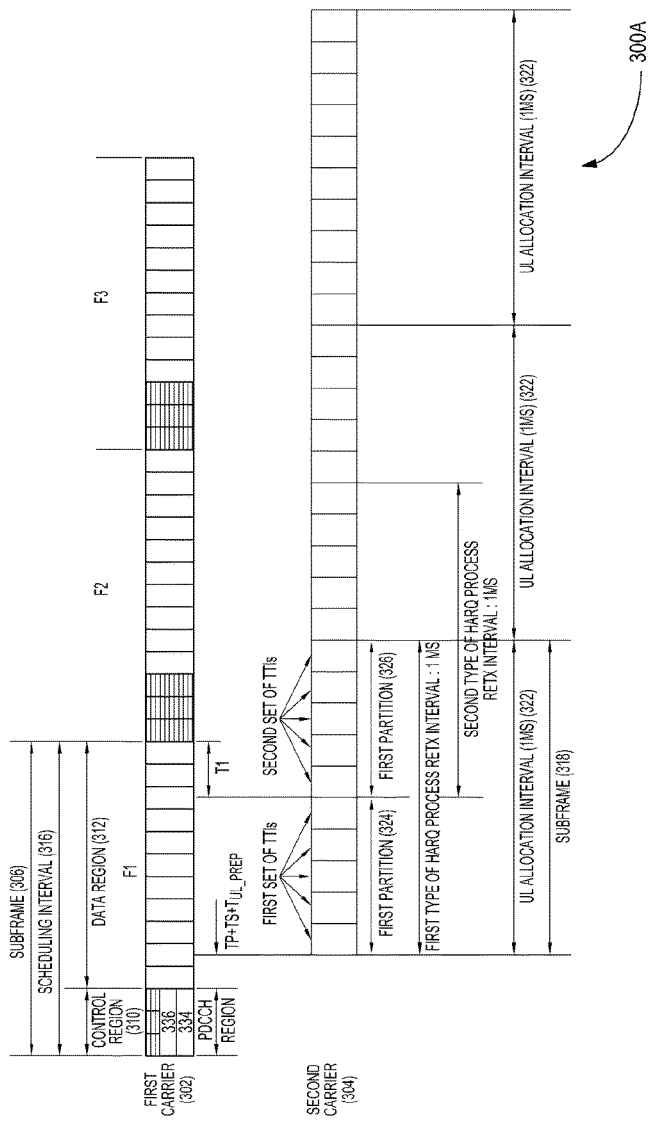
[Fig. 3a]

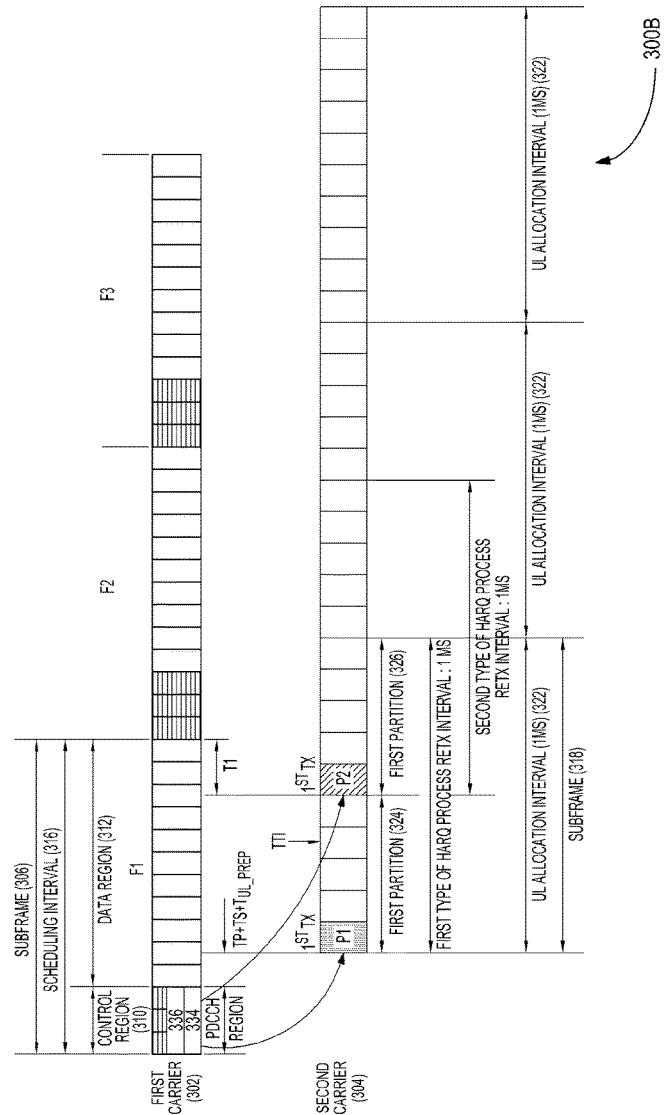
[Fig. 3b]

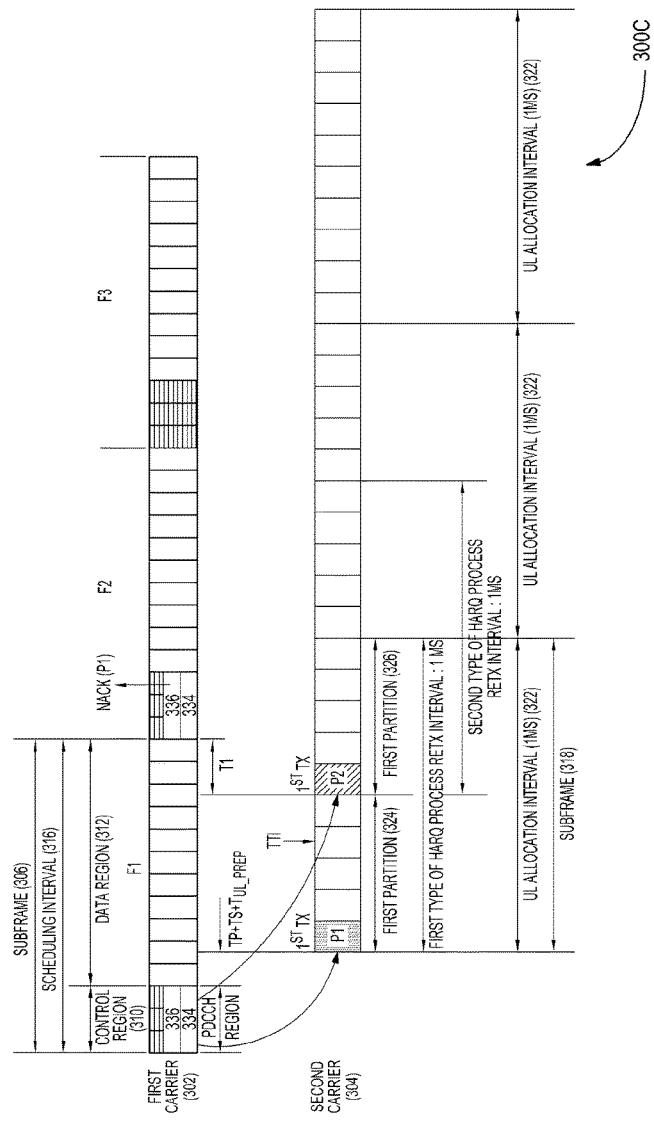
[Fig. 3c]

[Fig. 3d]
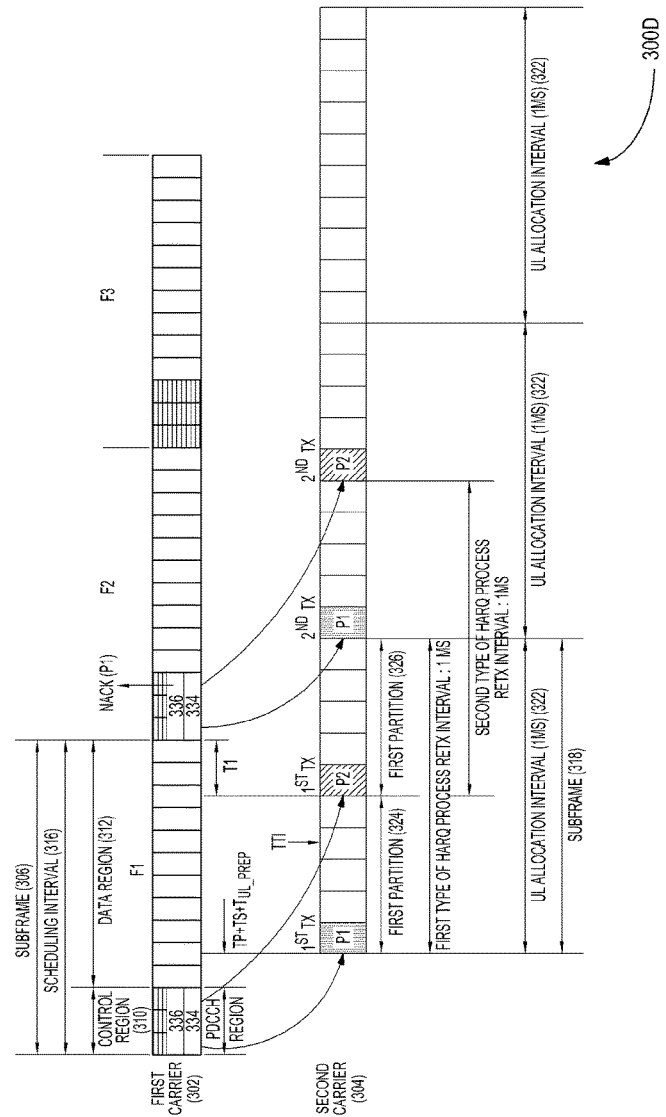

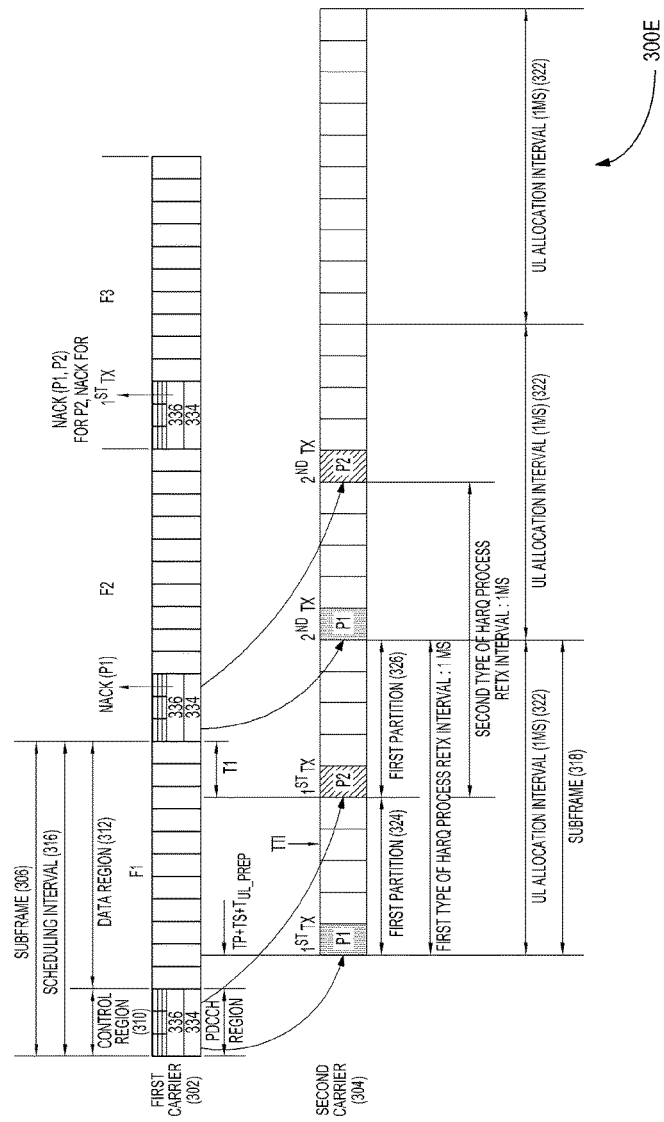
[Fig. 3e]

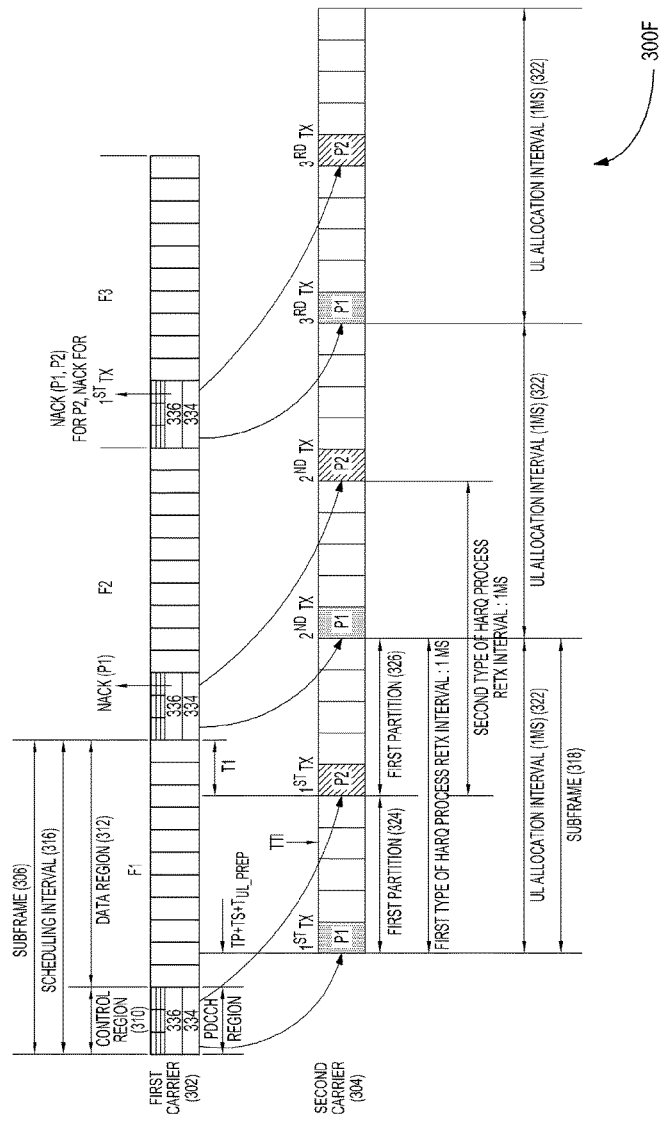
[Fig. 3f]

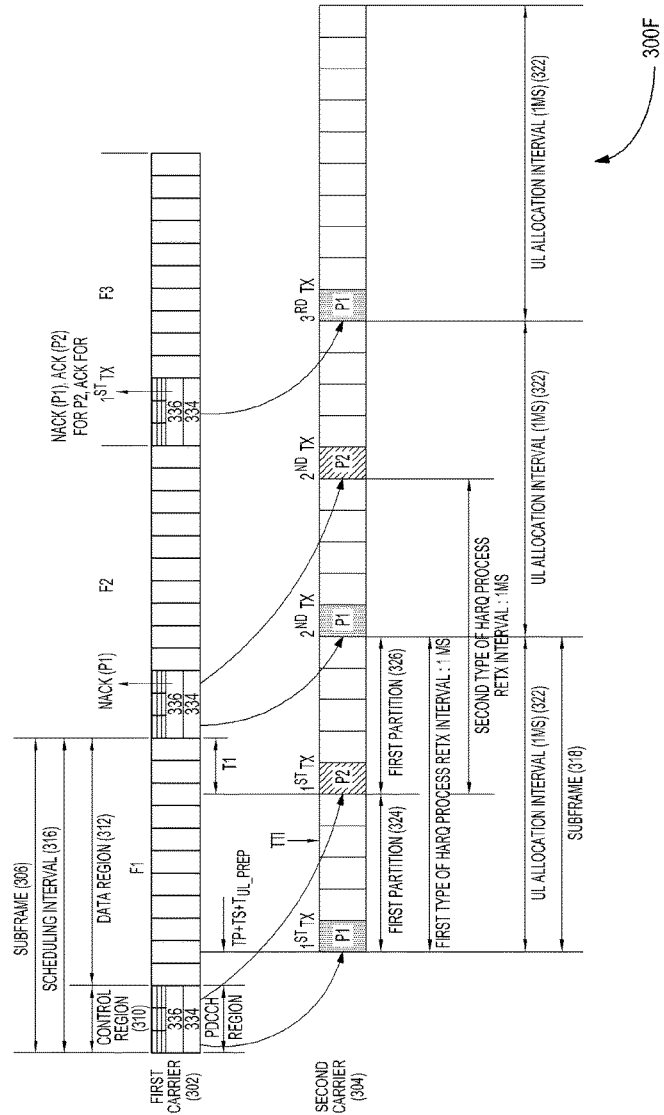
[Fig. 4]

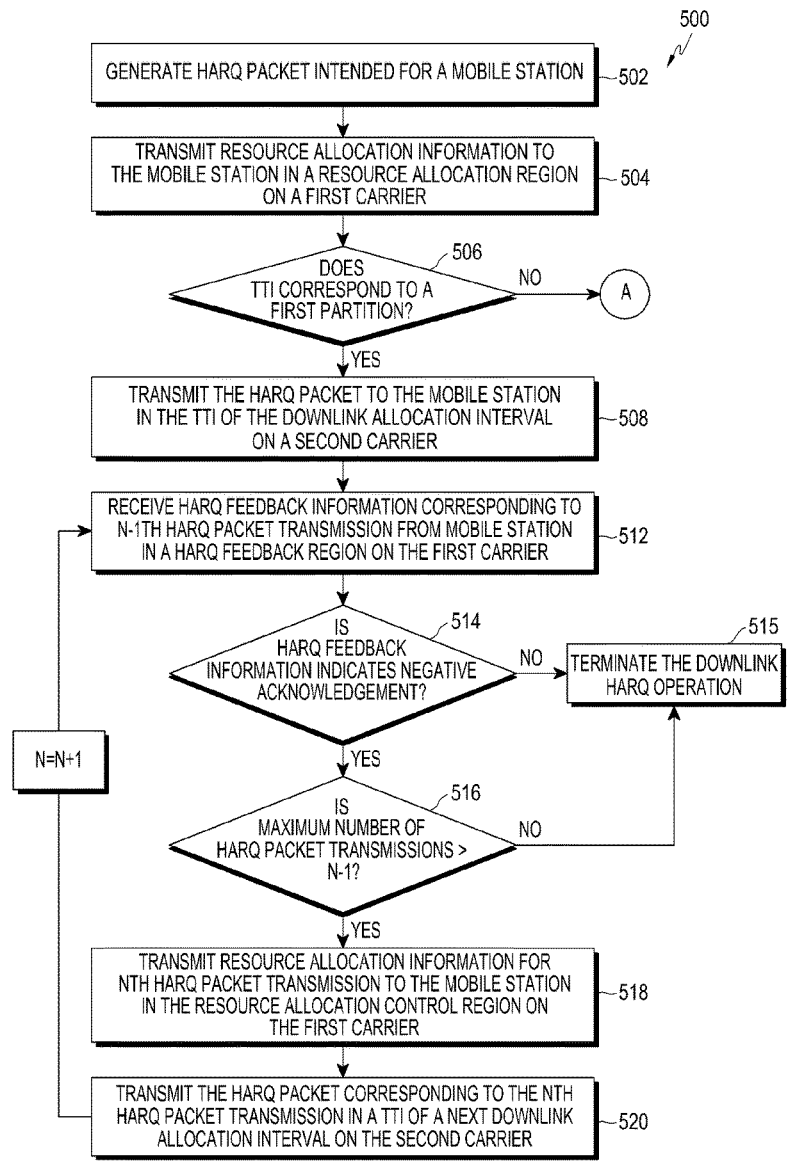
[Fig. 5a]

[Fig. 5b]
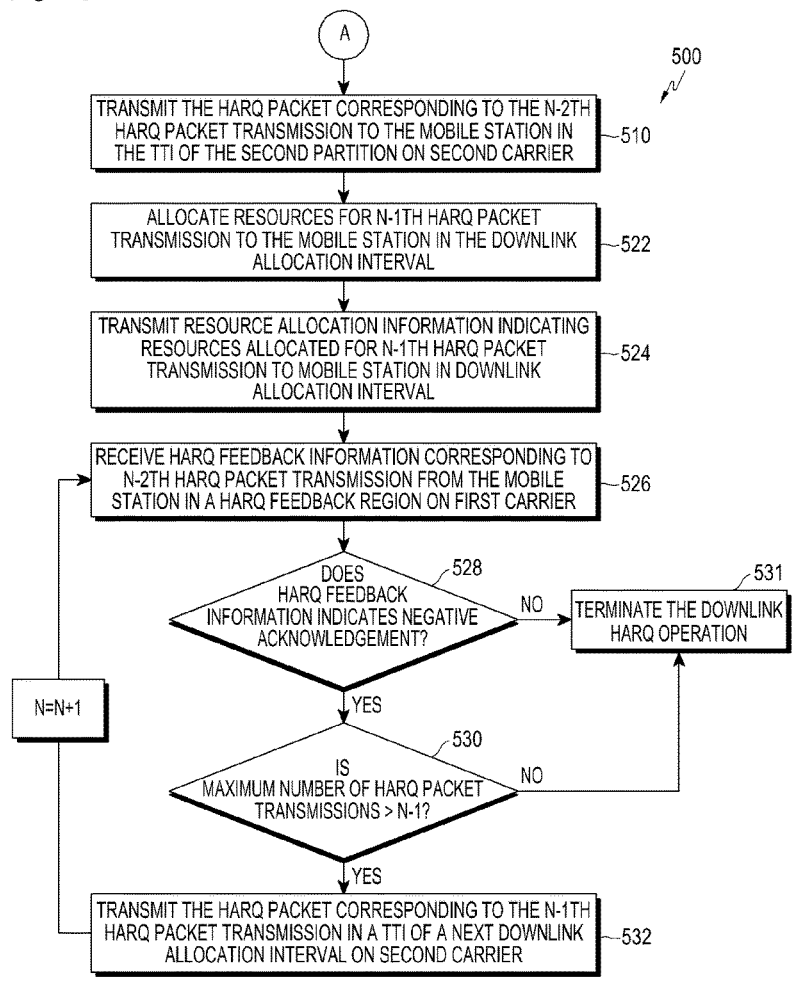

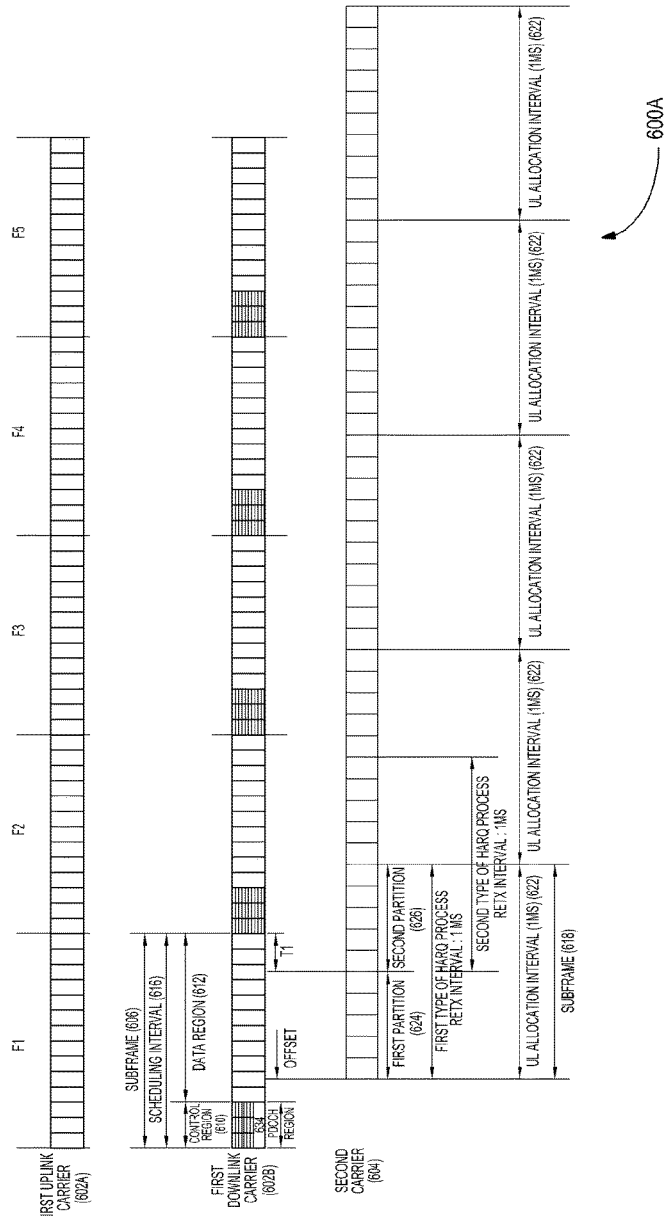
[Fig. 6a]

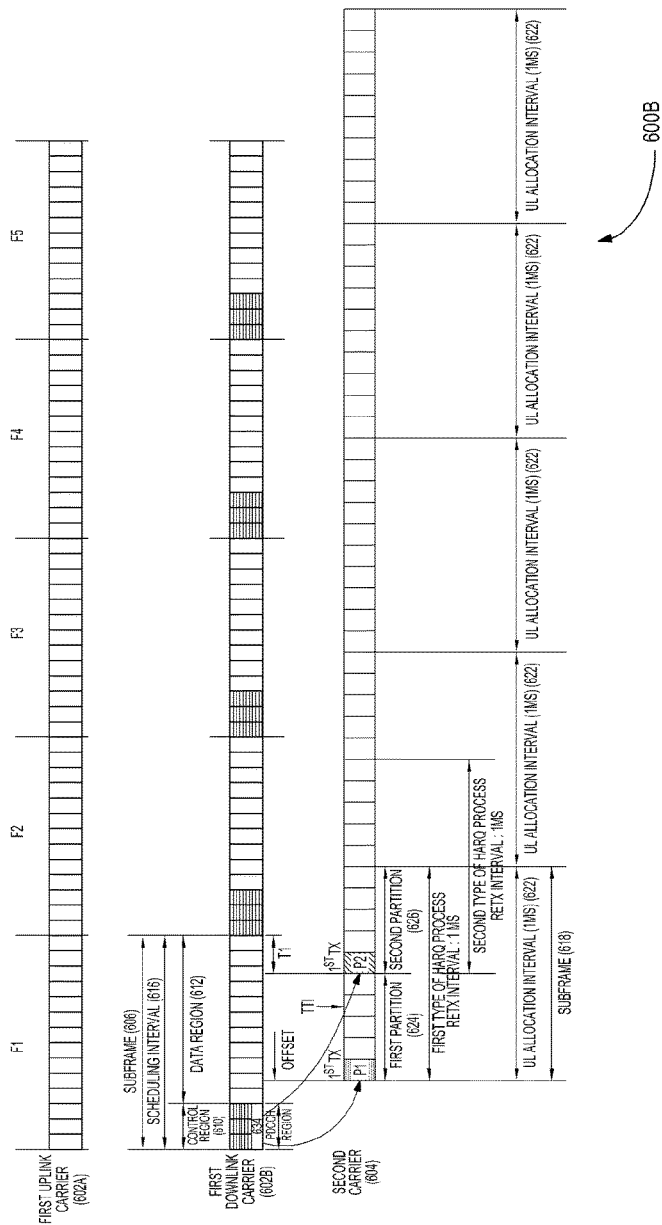
[Fig. 6b]

[Fig. 6c]
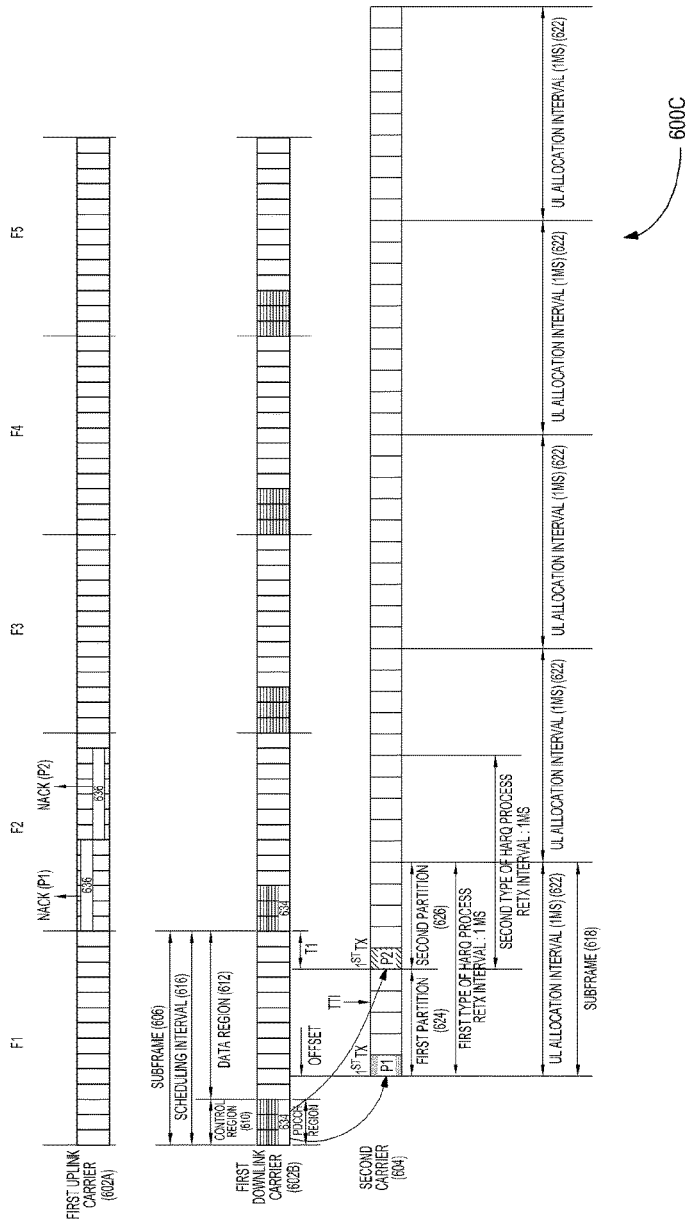

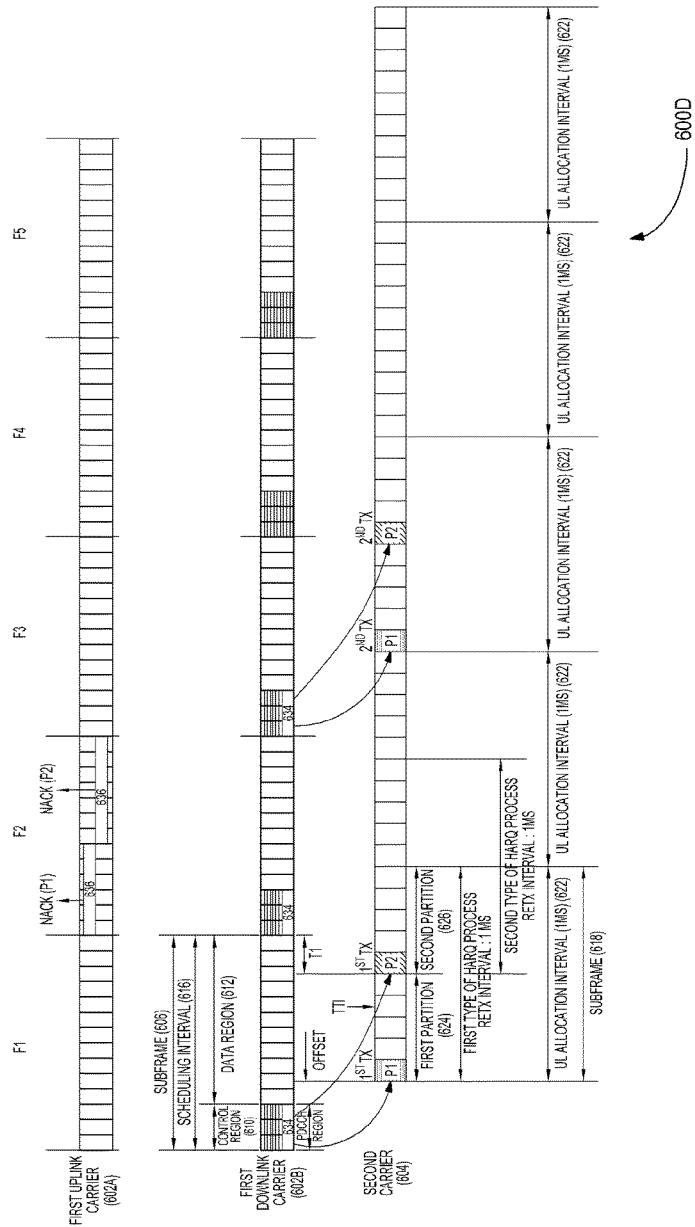
[Fig. 6d]

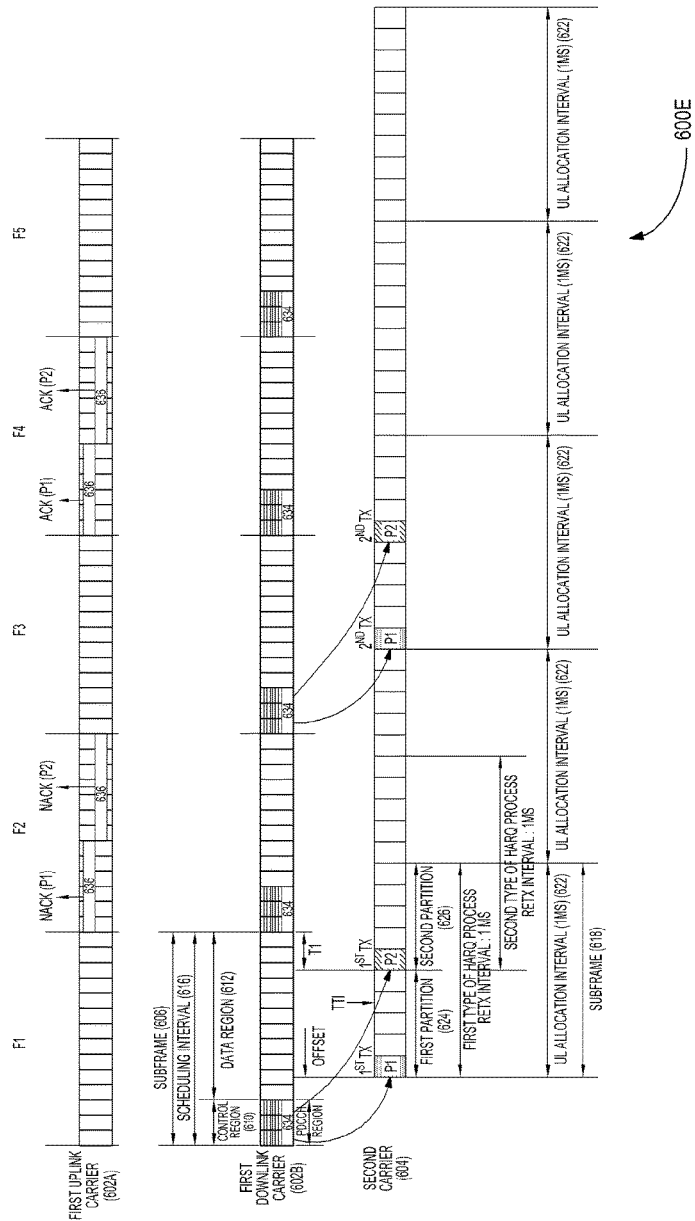
[Fig. 6e]

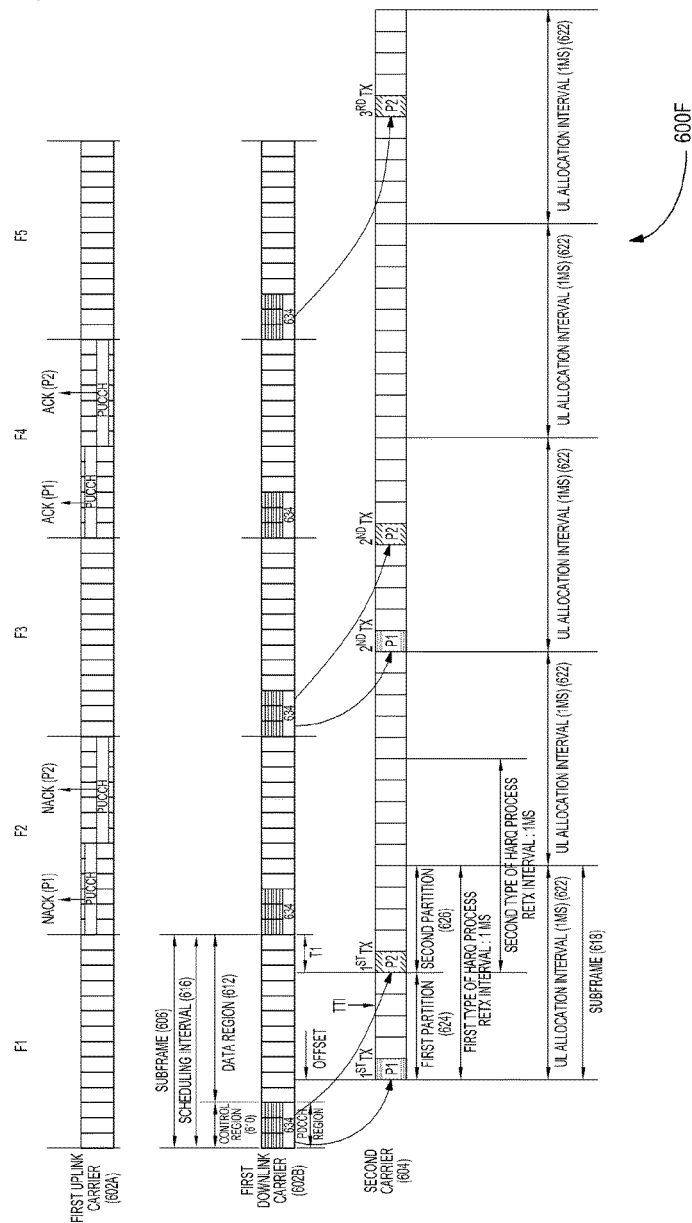
[Fig. 6f]

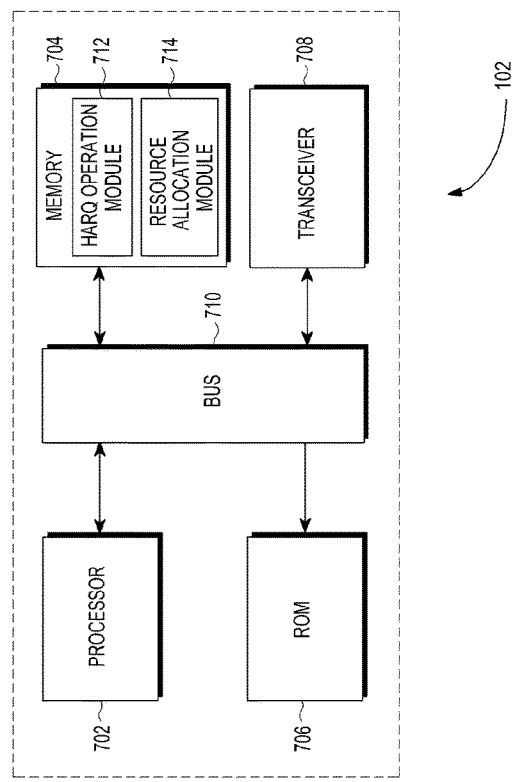
[Fig. 7]

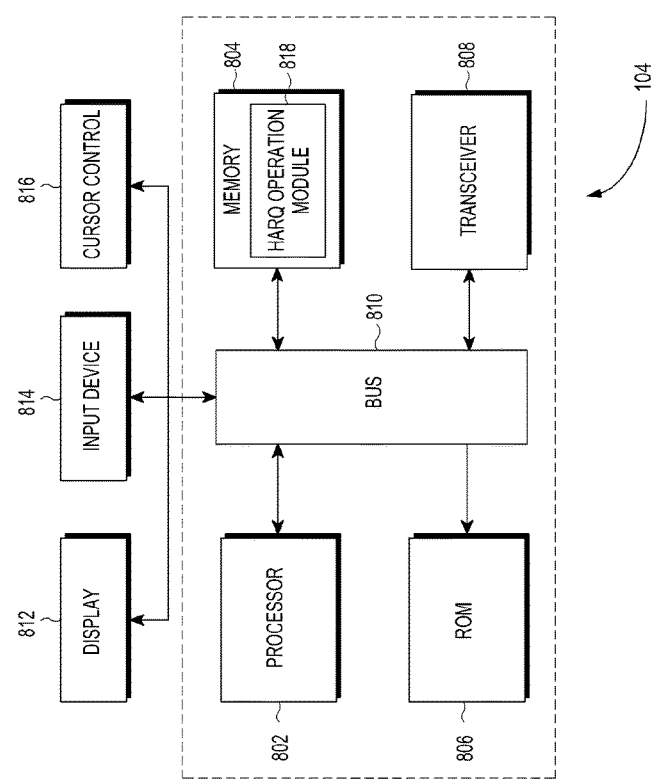
[Fig. 8]

METHOD AND SYSTEM FOR PERFORMING HYBRID AUTOMATIC REPEAT REQUEST OPERATION IN AN ASYMMETRIC MULTICARRIER COMMUNICATION NETWORK ENVIRONMENT

CROSS-REFERENCE TO RELATED APPLICATION(S)

The present application claims priority under 35 U.S.C. §365 to International Patent Application No. PCT/KR2013/008014 filed Sep. 5, 2013, entitled "METHOD AND SYSTEM FOR PERFORMING HYBRID AUTOMATIC REPEAT REQUEST OPERATION IN AN ASYMMETRIC MULTICARRIER COMMUNICATION NETWORK ENVIRONMENT". International Patent Application No. PCT/KR2013/008014 claims priority under 35 U.S.C. §365 and/or 35 U.S.C. §119(a) to Indian Patent Application No. 3680/CHE/2012 filed Sep. 2, 2012 and Indian Patent Application No. 3680/CHE/2012 filed Aug. 30, 2013, and which are incorporated herein by reference into the present disclosure as if fully set forth herein.

TECHNICAL FIELD

The present invention generally relates to the field of asymmetric multicarrier communication system, and more particularly relates to performing hybrid automatic repeat request (ARQ) operation in an asymmetric multicarrier communication network environment.

BACKGROUND ART

In the recent years, several broadband wireless technologies have been developed to meet growing number of broadband subscribers and to provide more and better applications and services. For example, the Third Generation Partnership Project 2 (3GPP2) developed Code Division Multiple Access 2000 (CDMA 2000), 1× Evolution Data Optimized (1×EVDO) and Ultra Mobile Broadband (UMB) systems. The $3^{rd}$ Generation Partnership Project (3GPP) developed Wideband Code Division Multiple Access (WCDMA), High Speed Packet Access (HSPA) and Long Term Evolution (LTE) systems. The Institute of Electrical and Electronics Engineers developed Mobile Worldwide Interoperability for Microwave Access (WiMAX) systems. As more and more people become users of mobile communication systems and more and more services are provided over these systems, there is an increasing need for mobile communication system with large capacity, high throughput, lower latency and better reliability.

Super Mobile Broadband (SMB) system based on millimeter waves, i.e., radio waves with wavelength in range of 1 millimeter (mm) to 10 mm, which corresponds to a radio frequency of 30 Gigahertz (GHz) to 300 GHz, is a candidate for next generation mobile communication technology as vast amount of spectrum is available in a millimeter Wave band. In general, an SMB network consists of multiple SMB base stations (BSs) that cover a geographic area. In order to ensure good coverage, SMB base stations need to be deployed with higher density than macro-cellular base stations. In general, SMB base stations are recommended to be deployed roughly at the same site-to-site distance as microcell or Pico-cell deployment in an urban environment. Typically, transmission and/or reception in an SMB system are based on narrow beams, which suppress the interference from neighboring SMB base stations and extend the range of an SMB link. However due to high path loss, heavy shadowing and rain attenuation reliable transmission at higher frequencies is one of the key issues that need to be overcome in order to make SMB system a practical reality.

Lower frequencies in a cellular band having robust link characteristics can be utilized with higher frequencies in an mmWave band to overcome reliability issues in the SMB system. In an asymmetric multicarrier communication network environment, a mobile station (MS) communicates with a base station (BS) using asymmetric multiband carriers consisting of at least one low frequency carrier in the cellular band and at least one high frequency carrier in the mmWave band. The primary carrier i.e., carrier operating on low frequencies and the secondary carrier i.e., carrier operating on high frequencies may be transmitted by same BS or different BS. Since the transmission characteristics of low frequency carriers in the cellular band and high frequency carriers in the mmWave band are quite different, transmission time intervals (TTIs) and frame structures for the primary carrier and the secondary carrier may not be same.

In an asymmetric multicarrier SMB network, low frequency carrier in a cellular band can be used to signal Hybrid Automatic Repeat Request (HARQ) control information (e.g., resource allocation (RA) and/or HARQ feedback or both) in order to gain on transmission reliability which is one of the prime challenges in mmWave transmission. In the conventional multicarrier system in which control regions of a primary carrier are used for transmitting RA and HARQ control information for a HARQ packet transmitted on a secondary carrier, HARQ operation timing is same as that of primary carrier as transmit time interval (TTI), feedback interval and retransmission interval for transmission of HARQ packet on the secondary carrier is same as that of the primary carrier.

An exemplary conventional multicarrier HARQ operation in downlink (DL) is illustrated in FIG. 1c. In FIG. 1c, resources are allocated for transmission of HARQ packet on a secondary DL carrier using a Packet Data Control Channel (PDCCH) transmitted on the primary carrier. The resources are allocated every scheduling interval for time duration equal to the scheduling interval. The time duration for which the resources are allocated is referred to as DL allocation interval. The DL allocation interval and scheduling interval is equal to 1 subframe i.e. 1 ms. The DCCH in subframe on the primary carrier indicates resources for a DL allocation interval of the secondary DL carrier where the DL allocation interval is aligned with the subframe of the primary carrier indicating resources for the DL allocation interval. One HARQ process is assigned to one mobile station in the DL allocation interval in the secondary carrier. One HARQ process constitutes one HARQ packet transmission (including the retransmissions and its feedback). One HARQ packet spans time duration of the DL allocation interval and a single HARQ packet is transmitted to the mobile station in a single DL allocation interval. One DL allocation interval is also the transmit time interval (TTI) for a HARQ packet.

In an exemplary DL HARQ operation, the HARQ packet transmitted to the mobile station in the DL allocation interval is received and processed by the mobile station and the HARQ feedback is sent by the mobile station after fixed number of subframes using a feedback channel (i.e., Physical Uplink Common Control Channel (PUCCH)) on the primary uplink carrier. Based on the HARQ feedback of the previous transmission, the base station determines whether to retransmit the HARQ packet or not. The base station retransmits the HARQ packet and indicates the resources for the same by transmitting the PDCCH. Multiple HARQ processes may exist between the mobile station and the base station. All HARQ processes follow same method of HARQ operation viz, resource adaptation after processing previous HARQ packet transmission, retransmission TTI is present after TTI in which the HARQ feedback is received by the base station, and transmission of HARQ packet is performed after the HARQ feedback is received by the base station.

An exemplary conventional multicarrier HARQ operation in uplink (UL) is illustrated in FIG. 1d. The resources are allocated for packet transmission on a secondary UL carrier using a packet data control channel (PDCCH) transmitted on a primary carrier. The resources are allocated every scheduling interval for time duration equal to the scheduling interval. Generally, the time duration for which the resources are allocated is referred as UL allocation interval. The UL allocation interval and the scheduling interval are equal to 1 subframe i.e. 1 ms. The PDCCH in a subframe on the primary carrier indicates resources for an UL allocation interval of a secondary UL carrier wherein the UL allocation interval is at a fixed offset from the subframe in the primary carrier indicating resources for the UL allocation interval.

One HARQ process is assigned to a single mobile station in UL allocation interval in the secondary carrier. One HARQ process constitutes one HARQ packet transmission (including the retransmissions and its feedback). One HARQ packet spans duration of UL allocation interval in time and a single HARQ packet is allowed to be transmitted by the mobile station. One allocation interval is also the transmit time interval (TTI) for a HARQ packet.

In an exemplary UL HARQ operation, the HARQ packet transmitted by the mobile station in the UL allocation interval is received and processed by the base station and the HARQ feedback is sent by the base station after fixed number of subframes using a HARQ feedback channel (i.e., Physical HARQ Feedback Indicator Channel (PHICH)) on the primary DL carrier. Based on the HARQ feedback of the previous transmission, the mobile station determines whether to retransmit the HARQ packet or not. In case of uplink HARQ operation, the UL allocation interval for retransmitting the HARQ packet is at a fixed place with respect to previous transmission and same resources as assigned for the previous transmission are used. The base station may change the resources in the UL allocation interval corresponding to the retransmission of HARQ packet. Multiple HARQ processes may exist between the mobile station and the base station. All HARQ processes follow same method of HARQ operation, viz. resource adaptation after processing previous HARQ packet transmission, retransmission TTI is present after the TTI in which the HARQ feedback is received by the mobile station, and transmission of HARQ packet is performed after the HARQ feedback is received by the mobile station.

In case of asymmetric multicarrier communication network, transmit time interval (TTI), feedback interval and retransmission interval for transmission of a HARQ packet on a high frequency carrier are much smaller than those of transmission of a HARQ packet on a low frequency carrier.

DISCLOSURE OF INVENTION

Technical Problem

The present invention provides a method and system for performing Hybrid Automatic Repeat Request (HARQ) operation in an asymmetric multicarrier communication network environment. In one embodiment, a method includes receiving resource allocation information from a base station in a scheduling interval of a first carrier, where the resource allocation information indicates resources and transmit time interval in an uplink allocation interval. The method includes transmitting the HARQ packet to the base station in the transmit time interval of the uplink allocation interval on the second carrier if the transmit time interval corresponds to a first partition of the uplink allocation interval. If the transmit time interval corresponds to a second partition of the uplink allocation interval, the method further includes transmitting the HARQ packet to the base station in the transmit time interval of the uplink allocation interval on the second carrier according to a second type of HARQ process.

BRIEF DESCRIPTION OF DRAWINGS

FIG. 1a is a schematic diagram depicting an asymmetric multicarrier communication network system in which data on a first carrier and a second carrier are transmitted by same base station (BS), in context of the invention.

FIG. 1b is a schematic diagram depicting another asymmetric multicarrier communication network system in which data on a first carrier and a second carrier are transmitted by different BSs, in the context of the invention.

FIG. 1c is a schematic representation depicting a conventional downlink hybrid automatic repeat request (HARQ) operation.

FIG. 1d is schematic representations depicting a conventional uplink HARQ operation.

FIGS. 2a and 2b are a process flowchart illustrating an exemplary method of performing uplink HARQ operation in an asymmetric multicarrier communication network environment, according to one embodiment.

FIGS. 3a-3f are schematic representations depicting an uplink HARQ operation, according to one embodiment.

FIG. 4 is a schematic representation depicting an uplink HARQ operation, according to another embodiment.

FIGS. 5a and 5b are a process flowchart illustrating an exemplary method of performing downlink HARQ operation in an asymmetric multicarrier communication network environment, according to one embodiment.

FIGS. 6a-6f are schematic representations depicting a downlink HARQ operation, according to one embodiment.

FIG. 7 is a block diagram of a base station, such as those shown in FIGS. 1a and 1b showing various components for implementing embodiments of the present subject matter.

FIG. 8 is a block diagram of a mobile station, such as those shown in FIGS. 1a and 1b, showing various components for implementing embodiments of the present subject matter.

The drawings described herein are for illustration purposes only and are not intended to limit the scope of the present disclosure in any way.

MODE FOR THE INVENTION

The present invention provides a method and system for performing Hybrid Automatic Repeat Request (HARQ) operation in an asymmetric multicarrier communication network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

In an asymmetric multicarrier communication network, a mobile station (MS) communicates with a base station (BS) using asymmetric carriers consisting of at least one low frequency carrier in a cellular band and at least one high frequency carrier in a millimeter Wave band. The first carrier, i.e., carrier operating on low frequency, is used to transmit control information including resource allocation information and Hybrid Automatic Repeat Request (HARQ) control information (e.g., HARQ feedback information) for a second carrier, i.e., carrier operating on high frequency. The first carrier and the second carrier may be transmitted by same base station (BS) or different BS. FIG. 1a is a schematic diagram 100 depicting an asymmetric multicarrier communication network system in which data on the first carrier and the second carrier are transmitted and received by same BS 102. FIG. 1b is a schematic diagram 150 depicting another asymmetric multicarrier communication network system in which data on the first carrier and second carrier are transmitted and received by different BSs 102. In asymmetric multicarrier communication network, transmit time interval (TTI), HARQ feedback interval, and HARQ packet retransmission interval for the low frequency carrier are different than those of the high frequency carrier. The present invention is applicable to any asymmetric multicarrier communication network system, wherein at least one of transmit time interval (TTI), HARQ feedback interval, and HARQ packet retransmission interval on the first carrier are different than HARQ packet transmission on a second carrier.

For the purpose explanation, low frequency carrier operation as defined in Third Generation Partnership Project (3GPP) Long Term Evolution (LTE) system is considered. However, the present invention is equally applicable to any other cellular broadband system.

FIGS. 2a and 2b are a process flowchart 200 illustrating an exemplary method of performing uplink hybrid automatic repeat request (HARQ) operation in an asymmetric multicarrier communication network 100, according to one embodiment. At step 202, resource allocation information is received from a base station 102 in a resource allocation region of a scheduling interval on a first carrier (e.g., low frequency carrier based on Long Term Evolution Technology). In some embodiments, the resource allocation information indicates resources (e.g., frequency and time resources), a transmit time interval (TTI) in an uplink allocation interval of a second carrier (e.g., a high frequency carrier based on millimeter wave band) for transmitting a HARQ packet on the second carrier.

At step 204, the HARQ packet intended for the base station 102 is generated. At step 206, it is determined whether the TTI indicated in the resource allocation information corresponds to a first partition of the uplink allocation interval. If it is determined that the TTI corresponds to the first partition, then at step 208, the HARQ packet is transmitted to the base station 102 in the TTI of the first partition of uplink allocation interval on the second carrier based on the allocated resources according to a first type of HARQ process (Type A). If it is determined that the TTI does not corresponds to the first partition, then it implies that the TTI corresponds to a second partition of the uplink allocation interval. In such case, at step 210, the HARQ packet is transmitted to the base station 102 in the TTI of the second partition of the uplink allocation interval on the second carrier based on the allocated resources according to a second type of HARQ process (Type B).

According to the present invention, the HARQ packet is transmitted in the TTI belonging to the first partition of uplink allocation interval for the type A HARQ process whereas for the type B HARQ process, the HARQ packet is transmitted in the TTI belonging to the second partition of the uplink allocation interval. In the type A HARQ process, second HARQ packet transmission (i.e., first HARQ packet retransmission) is performed if HARQ feedback information indicates negative acknowledgment of first HARQ packet transmission. In general, $N^{th}$ HARQ packet transmission of a type A HARQ process is performed if HARQ feedback information indicates negative acknowledgment of previous (i.e., $N-1^{th}$) HARQ packet transmission. This HARQ process is same as typical HARQ process known in the art. In the type B HARQ process, second HARQ packet transmission (i.e., first HARQ packet retransmission) is performed before receiving HARQ feedback information for first HARQ packet transmission while third HARQ packet transmission is performed if HARQ feedback information indicates negative acknowledgement of the first HARQ packet transmission. In general, $N^{th}$ HARQ packet transmission of a type B HARQ process is performed if HARQ feedback information indicates negative acknowledgment of $N-2^{th}$ HARQ packet transmission and $N^{th}$ HARQ packet transmission is performed before receiving the HARQ feedback information of $N-1^{th}$ HARQ packet transmission.

Upon transmitting the HARQ packet according to the first type of HARQ process, at step 212, HARQ feedback information corresponding to $N-1^{th}$ HARQ packet transmission is received from the base station 102 in a HARQ feedback control region on the first carrier, wherein N is greater than 1. It can be noted that the $N-1^{th}$ HARQ packet transmission corresponds to the HARQ packet transmitted at step 208 and step 232. At step 208, N is equal to 2. After step 220, N is changed to N+1. At step 214, it is determined whether the HARQ feedback information indicates negative acknowledgement of the $N-1^{th}$ HARQ packet transmission. If HARQ feedback information indicates negative acknowledgement, then at step 216, it is determined whether maximum number of HARQ packet transmissions is greater than N-1. If the HARQ feedback information indicates positive acknowledgment, the uplink HARQ operation is terminated, at step 215.

If, at 216, it is determined that maximum number of HARQ packet transmissions is not greater than N-1, then the uplink HARQ operation is terminated. If it is determined that maximum number of HARQ packet transmissions is greater than N-1, then at step 218, resource allocation information for $N^{th}$ HARQ packet transmission is received from the base station 102 in a resource allocation control region on the first carrier. The resource allocation information may be already known to the mobile station 104 for retransmitting the HARQ packet. In such case, at step 218, the mobile station 104 may receive modified resource allocation information from the base station 102. The resource allocation control region carrying the resource allocation information for the $N^{th}$ HARQ packet transmission may be located at the same time or after the HARQ feedback control region in which the HARQ feedback information for the $N-1^{th}$ HARQ packet transmission is received. At step 220, the HARQ packet corresponding to the $N^{th}$ HARQ packet transmission is transmitted in a TTI of a next uplink allocation interval on the second carrier based on the resource allocation information. It can be noted that, the TTI for the $N^{th}$ HARQ packet transmission is located after the HARQ feedback control region in which the HARQ feedback information for the N-1$^{th}$ HARQ packet transmission is received. The steps 212 to 220 are repeated till the base station 102 has successfully received the HARQ packet (i.e., HARQ feedback information indicates positive acknowledgement) and the maximum number of HARQ packet transmissions is not greater than N-1.

When the HARQ packet is transmitted in the TTI corresponding to the second partition of the uplink allocation interval, then the step 221 is performed. The HARQ packet transmitted in step 210 corresponds to the N-2$^{th}$ HARQ packet transmission, where N is an integer equal to 3. At step 221, modified resource allocation information for N-1$^{th}$ HARQ packet transmission is received from the base station 102 in a resource allocation control region on the first carrier. The step 221 is performed when uplink HARQ operation is asynchronous (i.e., resources for retransmission of the HARQ packet are indicated by the base station 102 for every retransmission) or when the uplink HARQ operation is adaptive synchronous (i.e., resources for retransmission of the HARQ packet are by default same as the first HARQ packet transmission but can be changed by the base station 102). It can be noted that, the resource allocation region carrying the modified resource allocation information for the N-1$^{th}$ HARQ packet transmission is located at the same time or after the HARQ feedback control region in which the HARQ feedback information for the N-2$^{th}$ HARQ packet transmission is received. However, in case uplink HARQ operation is synchronous (i.e., resources for retransmission of the HARQ packet are same as the first HARQ packet transmission) and non-adaptive (i.e., resources for retransmission of the HARQ packet cannot be changed by the base station 102), the step 222 is performed after step 220.

At step 222, the HARQ packet corresponding to N-1$^{th}$ HARQ packet transmission is transmitted to the base station 102 in a transmit time interval of a next uplink allocation interval on the second carrier. One skilled in the art would realize that the HARQ packet corresponding to the N-1$^{th}$ HARQ packet transmission is transmitted prior to reception of HARQ feedback information corresponding to N-2$^{th}$ HARQ packet transmission. At step 224, the HARQ feedback information corresponding to the N-2$^{th}$ HARQ packet transmission is received from the base station 102 in a HARQ feedback control region on the first carrier, where N is an integer greater than 2. It can be noted that the N-2$^{th}$ HARQ packet transmission corresponds to the HARQ packet transmitted in the second partition of the uplink allocation interval in step 210 and step 232. At step 210, N is equal to 3. After step 232, N is changed to N+1 (i.e., N is incremented by 1).

At step 226, it is determined whether the HARQ feedback information indicates negative acknowledgement of the N-2$^{th}$ HARQ packet transmission. If HARQ feedback information indicates negative acknowledgement, then at step 228, it is determined whether maximum number of HARQ packet transmissions is greater than N-1. If the HARQ feedback information indicates positive acknowledgment, the uplink HARQ operation is terminated, at step 227.

If, at 228, it is determined that maximum number of HARQ packet transmissions is not greater than N-1, then the uplink HARQ operation is terminated at step 227. If it is determined that maximum number of HARQ packet transmissions is greater than N-1, then at step 230, resource allocation information for $N^{th}$ packet transmission is received from the base station 102 in a resource allocation control region on the first carrier. It can be noted that, the resource allocation region carrying the resource allocation information for the $N^{th}$ HARQ packet transmission is located at the same time or after the HARQ feedback control region in which the HARQ feedback information for the N-2$^{th}$ HARQ packet transmission is received. It is understood that the step 230 is performed when the uplink HARQ operation is asynchronous (i.e., resources for retransmission of the HARQ packet are indicated by the base station 102 for every retransmission), or when the uplink HARQ operation is adaptive synchronous (i.e., resources for retransmission of the HARQ packet are by default same as the first HARQ packet transmission but can be changed by the base station 102). However, in case uplink HARQ operation is synchronous (i.e., resources for retransmission of the HARQ packet are same as the first HARQ packet transmission) and non-adaptive (i.e., resources for retransmission of the HARQ packet cannot be changed by the base station 102), the step 232 is performed after step 228.

At step 232, the HARQ packet corresponding to the $N^{th}$ HARQ packet transmission is transmitted to the base station 102 in a TTI of a next uplink allocation interval on the second carrier based on the received resource allocation information. It can be noted that, the TTI for the $N^{th}$ HARQ packet transmission is located after the HARQ feedback control region in which the HARQ feedback information for the N-2$^{th}$ HARQ packet transmission is received. The steps 224 to 232 are repeated till HARQ feedback information indicates positive acknowledgement and the maximum number of HARQ packet transmissions is not greater than N-1.

It is to be noted that $N^{th}$ (for N>1) HARQ packet transmission of a HARQ process is also referred as N-1$^{th}$ retransmission of a HARQ packet in some systems. For example, if maximum number of HARQ packet transmissions of an HARQ process is configured as 4, then first HARQ packet transmission is a new transmission and 2$^{nd}$, 3$^{rd}$ and 4$^{th}$ transmissions of the HARQ packet are referred as 1$^{st}$, 2$^{nd}$ and 3$^{rd}$ retransmissions of the HARQ packet of the HARQ process. For simple understanding and explanation, each transmission of HARQ packet is referred as 1$^{st}$, 2$^{nd}$, 3$^{rd}$ and 4$^{th}$ transmission of the HARQ packet in the present disclosure.

FIGS. 3a-3f are schematic representations depicting an uplink HARQ operation, according to one embodiment. FIG. 3a illustrates a schematic representation of a first carrier 302 and a second carrier 304. The first carrier 302 may be a low frequency carrier and the second carrier 304 may be a high frequency carrier. In an exemplary implementation, the first carrier 302 may be a primary carrier and the second carrier 304 may be a secondary carrier. In another exemplary implementation, the first carrier 302 may be a first secondary carrier and the second carrier 304 may be a second secondary carrier. It can be seen that from FIG. 3a that the second carrier 304 is asymmetric carrier with respect to the first carrier 302, wherein HARQ control information is sent on the first carrier 304 and HARQ packet is sent on the second carrier 304.

Each subframe 306 associated with the first carrier 302 includes a control region 310 and a data region 312. For example, each subframe 306 is 1 ms in size and is divided into ten slots 314, each slots is of 0.1 ms size. A scheduling interval 316 of the first carrier 302 spans an entire subframe 306. The control region 310 is divided into a resource allocation control region 334 and a HARQ feedback region 336.

Each subframe 318 is associated with the second carrier 304. An uplink allocation interval 322 in the second carrier 304 is aligned with boundary of the subframe 318 in the second carrier 304. However, the uplink allocation interval 322 can be offset from the boundary of the subframe 306 in the first carrier 302. The uplink allocation interval 322 is a time duration for which the resource allocation control region 334 of the subframe 306 on the first carrier 302 indicates resources allocated for transmission of HARQ packets in uplink direction on the second carrier 304. Further, the uplink allocation interval 322 is offset ($T_P+T_S+T_{ULPrep}$) from the boundary of the end of the control region 310 of the subframe 306. The offset is equal to at least time required to process resource allocation information received in the scheduling interval 316 of the first carrier 302 and time required to generate a HARQ packet.

The uplink allocation interval 322 consists of multiple TTIs (e.g., 10 TTIs). Each TTI carries one HARQ process, where each HARQ process carries one HARQ packet. That is, multiple HARQ processes are time division multiplexed in each uplink allocation interval 322. Multiple HARQ processes may be frequency division multiplexed in one slot in addition to time division multiplexing of HARQ processes in each uplink allocation interval 322.

In the present invention, two types of HARQ processes (i.e., first type of HARQ process and second type of HARQ process) are defined for transmitting HARQ packet. Retransmission interval of the first type of HARQ process is similar to the retransmission interval of the second type of HARQ process. In case of asynchronous transmission, retransmission interval referred herein is a minimum retransmission interval. Both the first type of HARQ process and the second type of HARQ process have a retransmission interval of 1 ms.

Method of retransmission associated with the first type of HARQ process is different from method of retransmission associated with the second type of HARQ process. Also, the TTIs reserved for transmission of HARQ packets associated with the first type of HARQ process are different from the TTIs reserved for transmission of HARQ packets associated with the second type of HARQ process. The uplink allocation interval 322 is divided into a first partition 324 and a second partition 326. The first partition 324 includes a first set of contiguous transmit time intervals (TTIs) which corresponds to first type of HARQ process and the second partition 326 includes a second set of contiguous transmit time intervals (TTIs) which correspond to second type of HARQ process. For example, the first set of contiguous TTIs contains five TTIs and the second set of TTIs contains five TTIs. The size of the first partition of the uplink allocation interval 322 is equal to number of TTIs in the uplink allocation interval 322 minus the pre-determined offset (T1) minus offset minus time duration (T PDCCH) of the resource allocation control region 334, where the offset is the time duration between the start of the uplink allocation interval 322 from the end of the control region 310 in the first carrier 302. In one exemplary implementation, the value of T1+offset+$T_{PDCCH}$ is quantized to TTI boundary. For example, if the uplink allocation interval 322 consists of ten TTIs, the size of the first partition 324 is equal to 10−(T1+offset+$T_{PDCCH}$)=5 TTIs and size of the second partition 326 is equal to T1+offset+$T_{PDCCH}$=5 TTIs.

Both the first partition 324 and the second partition 326 start at TTI boundary of the uplink allocation interval 322. The first TTI in the first set of contiguous TTIs starts at the beginning of the uplink allocation interval 322. The first TTI in the second set of contiguous TTIs is a TTI in the uplink allocation interval 322 which is at a predetermined offset (T1) before the start of the resource allocation control region 334 in a next scheduling interval 316 of the first carrier 302. The pre-determined offset (T1) is equal to at least the time required to process a HARQ packet and time required to prepare HARQ feedback information. The pre-determined offset (T1) may also include time corresponding to timing advance. It can be noted that, maximum timing advance supported by the asymmetric multicarrier communication network system 100 may be considered to compute the pre-determined offset. The predetermined offset (T1) is quantized to a TTI boundary.

As shown in FIG. 3a, the base station 102 transmits resource allocation information to the mobile station 104 in the resource allocation control region 310 in the scheduling interval 316 on the first carrier 302. For example, the base station 102 transmits a Secondary Packet Data Control Channel (S-PDCCH) carrying the resource allocation information in a PDCCH region of the subframe 306 on the first carrier 302. The resource allocation information indicates resources and TTI in the uplink allocation interval 322 for transmitting a HARQ packet on the second carrier 304. The TTI indicated in the resource allocation information corresponds to one of the first partition 324 and the second partition 326 of the uplink allocation interval 322.

Consider that, the TTI corresponds to the first partition 324 of the uplink allocation interval 322. As shown in FIG. 3b, the mobile station 104 transmits a HARQ packet (P1) corresponding to a first HARQ packet transmission ($1^{st}$Tx) to the base station 102 in the TTI of the first partition 324 of the uplink allocation interval 322 according to a first type of HARQ process (Type A HARQ process). However, if the TTI corresponds to the second partition 326 of the uplink allocation interval 322, the mobile station 104 transmits a HARQ packet (P2) corresponding to a first HARQ packet transmission ($1^{st}$Tx) to the base station 102 in the TTI of the second partition 326 of the uplink allocation interval 322 according to a second type of HARQ process (Type B HARQ process).

For the first type of HARQ process, consider that the base station 102 have not received the HARQ packet (P1) transmitted by the mobile station 104 in the TTI of the first partition 324 of the uplink allocation interval 322. As shown in FIG. 3c, the base station 102 transmits HARQ feedback information in a Physical Hybrid-ARQ Indicator Channel (PHICH) to the mobile station 104 in a HARQ feedback region 336 of the next subframe 306 (F2) on the first carrier 302. The HARQ feedback information indicates negative acknowledgement (NACK) of the first HARQ packet transmission in the TTI of the first partition 324. As shown in FIG. 3c, the base station 102 also transmits resource allocation information in the resource allocation control region 334 of the next subframe 306 (F2). The resource allocation information indicates resources and/or TTI for transmitting the HARQ packet (P1) associated with the second HARQ packet transmission ($2^{nd}$Tx) in the first partition 324 of the next subframe 318.

It can be noted that, the base station 102 transmits HARQ feedback information indicating positive acknowledgement (ACK) of the first HARQ packet transmission ($1^{st}$Tx) in the HARQ feedback region 336 if the base station 102 has received and processed the HARQ packet (P1) corresponding to the first HARQ packet transmission transmitted in the TTI of the first partition 324. The base station 102 receives and processes the HARQ packet (P1) transmitted in the first partition 324 of the uplink allocation interval 322 before allocating or adapting resources for the second HARQ packet transmission.

For the second type of HARQ process, consider that the base station 102 have not received the HARQ packet (P2) transmitted by the mobile station 104 in the TTI of the second partition 326 of the uplink allocation interval 322. Hence the base station 102 does not transmit HARQ feedback information indicating positive acknowledgement or negative acknowledgement of the first HARQ packet transmission in the HARQ feedback region 336 of the subframe 306 (F2) on the first carrier 302 when the mobile station 104 has transmitted the HARQ packet (P2) corresponding to the first HARQ packet transmission in the TTI corresponding to the second partition 326 of the uplink allocation interval 322. This is because time duration between transmitting the HARQ packet (P2) in the second partition 326 and transmitting the HARQ feedback information in the HARQ feedback region 336 of the subframe 306 (F2) is less than the time duration required for receiving and processing the HARQ packet (P2) transmitted in the second partition 326 and preparing the HARQ feedback information. As shown in FIG. 3c, the base station 102 transmits resource allocation information in the resource allocation control region 334 of the next subframe 306 (F2). The resource allocation information indicates resources and/or TTI for transmitting the second HARQ packet transmission of the HARQ packet (P2) in the second partition 326 of the next subframe 318. The base station 102 allocates or adapts resources for the second HARQ packet transmission before receiving and processing the HARQ packet (P1) transmitted in the second partition 326 of the uplink allocation interval 322. AHAR-HARQ For the first type of HARQ process, since the HARQ feedback information indicates negative acknowledgement (NACK) of the HARQ packet (P1) transmitted in the first partition 324, the mobile station 104 performs a second HARQ packet transmission. That is, the mobile station 104 transmits the HARQ packet (P1) corresponding to the second HARQ packet transmission ($2^{nd}$Tx) in the TTI of the first partition 324 in the subsequent subframe 318 on the second carrier 304 based on the resource allocation information as shown in FIG. 3d. The mobile station 104 transmits the HARQ packet (P1) corresponding to the second HARQ packet transmission ($2^{nd}$Tx) in the TTI of the first partition 324 in the subsequent subframe 318 on the second carrier 304 after receiving the HARQ feedback information for the HARQ packet (P1) corresponding to the first HARQ packet transmission ($1^{st}$Tx).

In case of the second type of HARQ process, although the mobile station 104 has not received HARQ feedback information indicating negative/positive acknowledgement, the mobile station 104 transmits the HARQ packet (P2) corresponding to the second HARQ packet transmission to the base station 102 in the TTI of the second partition 326 of the next uplink allocation interval 322 on the second carrier 304 as shown in FIG. 3d. This increases the probability that the base station 102 will decode the HARQ packet (P2) corresponding to the second HARQ packet transmission ($2^{nd}$Tx) transmitted in the second partition 326 on the second carrier 304 in case the base station 102 have not received the HARQ packet (P2) corresponding to the first HARQ packet transmission ($1^{st}$Tx) transmitted in the second partition 326 on the second carrier 304. The base station 102 transmits resource allocation information in an S-PDCCH in the resource allocation control region 334 of the subframe 306 (F2) on the second carrier 304 for the second HARQ packet (P2) transmission. Accordingly, the mobile station 104 transmits the HARQ packet (P2) corresponding to the second HARQ packet transmission to the base station 102 in the TTI of the second partition 326 of the next uplink allocation interval 322 on the second carrier 304.

Now, for the first type of HARQ process, consider that the base station 102 has not received the HARQ packet (P1) corresponding to the second HARQ packet transmission ($2^{nd}$Tx) transmitted in the TTI of the first partition 324 on the first carrier 302. In such case, as illustrated in FIG. 3e, the base station 102 transmits HARQ feedback information in the HARQ feedback region 336 of the subframe 306 (F3) on the first carrier 302 where the HARQ feedback information indicates negative acknowledgement (NACK) of the second HARQ packet transmission ($2^{nd}$Tx) performed in the first partition 324 of the uplink allocation interval 322. As illustrated in FIG. 3f the base station 102 also transmits resource allocation information in an S-PDCCH in the resource allocation control region 334 of the subframe 306 (F3) on the second carrier 304. Accordingly, the mobile station 104 transmits the HARQ packet (P1) corresponding to the third HARQ packet transmission ($3^{rd}$Tx) to the base station 102 in the TTI of the first partition 324 of the next uplink allocation interval 322 on the second carrier 304 based on the resource allocation information.

In case of second type of HARQ process, consider that the base station 102 has not received the HARQ packet (P2) corresponding to the first HARQ packet transmission ($1^{st}$Tx) transmitted in the TTI of the second partition 326 on the second carrier 304. In such case, the base station 102 transmits HARQ feedback information in the HARQ feedback region 336 of the subframe 306 (F3) on the first carrier 302 where the HARQ feedback information indicates negative acknowledgement (NACK) of the first HARQ packet transmission ($1^{st}$Tx) performed in the second partition 326 of the uplink allocation interval 322. The base station 102 also transmits resource allocation information in an S-PDCCH in the resource allocation control region 334 of the subframe 306 (F3) on the second carrier 304. Accordingly, the mobile station 104 transmits the HARQ packet (P2) corresponding to the third HARQ packet transmission ($3^{rd}$Tx) to the base station 102 in the TTI of the second partition 326 of the next uplink allocation interval 322 on the second carrier 304 based on the resource allocation information as shown in FIG. 3f.

It can be noted that, the resource allocation control region 334 of the first carrier 302 meant for indicating/adapting resources for retransmission of a HARQ packet is same irrespective of whether a HARQ process is started in the first partition 324 or the second partition 326 of the uplink allocation interval 322. The resource allocation control region 334 of the first carrier 302 for indicating/adapting resources for retransmission of the HARQ packet transmitted in the uplink allocation interval 322 whose resources are indicated in the resource allocation control region 334 of a subframe number 'n' of the first carrier 324 is equal to the resource allocation control region 334 in the subframe number 'n+1' of the first carrier 324. As illustrated in FIG. 3f, resources for retransmission of HARQ packets P1 and P2 started in different parts of the uplink allocation interval 322 corresponding to the subframe number Fn is indicated/adapted using an S-PDCCH in the subframe number Fn+1.

The HARQ feedback control region 336 of the first carrier 302 for transmission of HARQ feedback information corresponding to the HARQ packet received from the mobile station 104 is determined based on the partition of the uplink allocation interval 322 in which the HARQ packet is received. The HARQ feedback control region 336 of the first carrier 302 for transmission of HARQ feedback for the HARQ packet transmitted in first partition 322 of the uplink allocation interval 322 whose resources are indicated by the resource allocation control region 334 of subframe number 'n' in the first carrier 302 is same as the HARQ feedback control region 336 in the subframe number 'n+1' of the first carrier 302. The HARQ feedback control region 336 of the first carrier 302 for transmitting HARQ feedback for the HARQ packet transmitted in the second partition 326 of the uplink allocation interval 322 whose resources are indicated by the resource allocation control region 334 of subframe number 'n' in first carrier is same as the HARQ feedback control region 336 in subframe number 'n+2' in the first carrier 302. As illustrated in FIG. 3f, the HARQ feedback information for the HARQ packet P1 transmitted in the first partition 324 of the uplink allocation interval 322 corresponding to the subframe number Fn is sent in a PHICH in the subframe number Fn+1. Also, the HARQ feedback information for the HARQ packet P2 transmitted in the second partition 326 of the uplink allocation interval 322 corresponding to subframe number Fn is sent in a PHICH in subframe number Fn+2.

FIG. 4 is a schematic representation 400 depicting an uplink HARQ operation, according to another embodiment. It can be seen that, the schematic representation of FIG. 4 is similar to the schematic representation of FIG. 3f, except that the HARQ feedback information transmitted in the HARQ feedback region 336 of the subframe 306 (F3) indicates a positive acknowledgement (ACK) of the HARQ packet (P2) corresponding to the first HARQ packet transmission ($1^{st}$Tx). In such case, the mobile station 104 terminates the HARQ operation associated with the second type of HARQ process (Type B). It can be noted that, when the HARQ feedback information indicates positive acknowledgment, the base station 102 does not transmits resource allocation information in an S-PDCCH in the resource allocation control region 334 of the subframe 306 (F3) on the second carrier 304 for the third HARQ packet transmission $3^{rd}$Tx).

FIGS. 5a and 5b are a process flowchart 500 illustrating an exemplary method of performing downlink hybrid automatic repeat request (HARQ) operation in an asymmetric multicarrier communication network 100, according to another embodiment. At step 502, a HARQ packet intended for the base station 102 is generated. At step 504, resource allocation information is transmitted to the mobile station 104 in a resource allocation region of a scheduling interval on a first carrier (e.g., low frequency carrier based on Long Term Evolution Technology). In some embodiments, the resource allocation information indicates allocated resources (e.g., frequency and time resources), a transmit time interval (TTI) in a downlink allocation interval of a second carrier (e.g., a high frequency carrier based on millimeter wave band) for receiving the HARQ packet by the mobile station 104.

At step 506, it is determined whether the TTI for transmitting the HARQ packet corresponds to a first partition of the downlink allocation interval. If it is determined that the TTI corresponds to the first partition, then at step 508, the HARQ packet is transmitted to the mobile station 104 in the TTI of the downlink allocation interval on the second carrier according to a first type of HARQ process based on the allocated resources. If it is determined that the TTI does not correspond to the first partition, then it implies that the TTI corresponds to a second partition of the downlink allocation interval. In such case, at step 510, the HARQ packet is transmitted to the mobile station 104 in the TTI of the downlink allocation interval on the second carrier according to a second type of HARQ process based on the allocated resources.

Upon transmitting the HARQ packet according to the first type of HARQ process, at step 512, HARQ feedback information corresponding to N-PhHARQ packet transmission ($N-1^{th}$ refers to previous HARQ packet transmission) is received from the mobile station 104 in a HARQ feedback control region on the first carrier. It can be noted that the $N-1^{th}$ HARQ packet transmission corresponds to the HARQ packet transmitted according to the first type of HARQ process at step 508 and step 520. At step 508, N is equal to 2. After step 520, N is changed to N+1. At step 514, it is determined whether the HARQ feedback information indicates negative acknowledgement of the $N-1^{th}$ HARQ packet transmission. If HARQ feedback information indicates negative acknowledgement, then at step 516, it is determined whether maximum number of HARQ packet transmissions is greater than N-1. If the HARQ feedback information indicates positive acknowledgment, the downlink HARQ operation is terminated at step 515.

If, at 516, it is determined that maximum number of HARQ packet transmissions is not greater than N-1, then the downlink HARQ operation is terminated at step 515. If it is determined that maximum number of HARQ packet transmissions is greater than N-1, then at step 518, resource allocation information for $N^{th}$ HARQ packet transmission is transmitted to the mobile station 104 in a resource allocation control region on the first carrier. It can be noted that, the resource allocation control region carrying the resource allocation information for the $N^{th}$ HARQ packet transmission is located after the HARQ feedback control region in which the HARQ feedback information for the $N-1^{th}$ HARQ packet transmission is received. At step 520, the HARQ packet corresponding to the $N^{th}$ HARQ packet transmission is transmitted in a TTI of a next downlink allocation interval on the second carrier based on the received resource allocation information. It can be noted that, the TTI for the $N^{th}$ HARQ packet transmission is located after the HARQ feedback control region in which the HARQ feedback information for the $N-1^{th}$ HARQ packet transmission is received. The steps 512 to 520 are repeated till the mobile station 104 has successfully received the HARQ packet (i.e., HARQ feedback information indicates positive acknowledgement) and the maximum number of HARQ packet transmissions is not greater than N-1.

When the HARQ packet is transmitted in the TTI corresponding to the second partition of the downlink allocation interval according to the second type of HARQ process, then the step 522 is performed. Consider that, the HARQ packet transmitted in step 510 corresponds to the $N-2^{th}$ HARQ packet transmission, where N is an integer equal to 3. At step 522, resources for the $N-1^{th}$ HARQ packet transmission in the downlink allocation interval are allocated to the mobile station 104. At step 524, resource allocation information indicating the resources allocated for $N-1^{th}$ packet transmission is transmitted to the mobile station 104 in a resource allocation control region on the first carrier. It can be noted that, the resource allocation region carrying the resource allocation information for the $N-1^{th}$ HARQ packet transmission is located before the HARQ feedback control region in which the HARQ feedback information for the $N-2^{th}$ HARQ packet transmission is going to be received.

At step 526, HARQ feedback information associated with the $N-2^{th}$ HARQ packet transmission is received from the mobile station in a HARQ feedback control region on the first carrier. It can be noted that the $N-2^{th}$ HARQ packet transmission corresponds to the HARQ packet transmitted in the second partition of the downlink allocation interval according to the second type of HARQ process in step 510 and step 532. For step 510, N is equal to 3. At step 528, it is determined whether the HARQ feedback information indicates negative acknowledgement of the N−2$^{th}$ HARQ packet transmission. If HARQ feedback information indicates negative acknowledgement, then at step 530, it is determined whether maximum number of HARQ packet transmissions is greater than N−1. If, at 530, it is determined that maximum number of HARQ packet transmissions is greater than N−1, then the downlink HARQ operation is terminated. If it is determined that maximum number of HARQ packet transmissions is not greater than N−1, then at step 532, the HARQ packet corresponding to the N−1$^{th}$ HARQ packet transmission is transmitted to the mobile station 104 in a TTI of a subsequent downlink allocation interval on the second carrier based on the resources allocated earlier for the N−1$^{th}$ transmission. After step 532, N is set to N+1. It can be noted that, the TTI for the N−1$^{th}$ HARQ packet transmission is located after the HARQ feedback control region in which the HARQ feedback information for the N−2$^{th}$ HARQ packet transmission is received. The steps 522 to 532 are repeated till HARQ feedback information indicates positive acknowledgement and the maximum number of HARQ packet transmissions is not greater than N−1.

If, at step 528, it is determined that the HARQ feedback information indicates positive acknowledgment of the N−2$^{th}$ HARQ packet transmission, then the current HARQ packet transmission is terminated and a new HARQ packet is transmitted to the mobile station 104 in the downlink allocation interval using the resources allocated for the N−1$^{th}$ HARQ packet transmission. This happens without any explicit signaling to indicate a new HARQ packet is going to be transmitted by the base station 102 in the resources allocated for the N−1$^{th}$ HARQ packet transmission. The PHY parameters used by the base station 102 and the mobile station 104 can be indicated as follows. In one exemplary implementation, the base station 102 assigns different sets of parameters for new HARQ packet transmission and retransmission during allocation of the resources for the N−1$^{th}$ HARQ packet transmission such that one of set of parameters are used for ongoing HARQ operation when the HARQ feedback information indicates negative acknowledgment for N−2$^{th}$ HARQ packet transmission and another set of parameters are used for new HARQ packet transmission when the HARQ feedback information indicates positive acknowledgement for the N−2$^{th}$ HARQ packet transmission. Alternatively, the base station 102 assigns a single set of parameters during allocation of the TTI so that the set of parameters are used for ongoing HARQ operation and for new HARQ operation.

In another embodiment, if the HARQ feedback information indicates positive acknowledgement of the N−2$^{th}$ HARQ packet transmission, then the HARQ packet transmitted during the N−2$^{th}$ HARQ packet transmission is retransmitted in the downlink allocation interval using the resources allocated for the N−1$^{th}$ HARQ packet transmission and the HARQ process is terminated.

In yet another embodiment, if the HARQ feedback information indicates positive acknowledgement of the N−2$^{th}$ HARQ packet transmission, then no transmission is done in the downlink allocation interval using the resources allocated for the N−1$^{st}$ HARQ packet transmission and the HARQ process is terminated.

It is to be noted that N$^{th}$ (for N>1) HARQ packet transmission of a HARQ process is also referred as N−1$^{st}$ retransmission of an HARQ packet in some systems. For example, if maximum number of HARQ transmissions of a HARQ process is configured as 4, then first HARQ packet transmission is a new transmission and 2$^{nd}$, 3$^{rd}$ and 4$^{th}$ transmission of the HARQ packet are referred as 1$^{st}$, 2$^{nd}$ and 3$^{rd}$ retransmissions of the HARQ packet of the HARQ process. For simple understanding and explanation each transmission of HARQ packet is referred to as 1$^{st}$, 2$^{nd}$, 3$^{rd}$ and 4$^{th}$ transmission of HARQ packet in the present disclosure.

FIGS. 6a-6f are schematic representations depicting a downlink HARQ operation, according to another embodiment. FIG. 6a illustrates a schematic representation of a first uplink carrier 602A, a first downlink carrier 602B, and a second carrier 604. The first uplink carrier 602A and the first downlink carrier 602B may be a low frequency carrier and the second carrier 304 may be a high frequency carrier. In an exemplary implementation, the first uplink carrier 602A and the first downlink carrier 602B may be a primary carrier and the second carrier 604 may be a secondary carrier. In another exemplary implementation, the first uplink carrier 602A and the first downlink carrier 602B may be a first secondary carrier and the second carrier 604 may be a second secondary carrier. It can be seen that from FIG. 6a that, the second carrier 604 is asymmetric carrier with respect to the first uplink carrier 602A and the first downlink carrier 602B.

Each subframe 606 is associated with the first downlink carrier 602B includes a control region 610 and a data region 612. For example, each subframe 606 is 1 ms in size and is divided into ten slots 614, each slots is of 0.1 ms size. A scheduling interval 616 of the first downlink carrier 602B spans an entire subframe 606. The control region 610 includes a resource allocation control region 634 for the first downlink carrier 602B. Similarly, the control region 610 for the first uplink carrier 602B includes a HARQ feedback region 636 as shown in FIG. 6c.

Each subframe 618 is associated with the second carrier 604 corresponds to a downlink allocation interval 622. A downlink allocation interval 622 in the second carrier 604 is aligned with boundary of the subframe 618 in the second carrier 604. However, the downlink allocation interval 622 can be offset from the boundary of the subframe 618 in the second carrier 604. The downlink allocation interval 622 is a time duration for which the resource allocation control region 634 of the subframe 606 on the first carrier 602 indicates resources allocated for transmission of HARQ packets in downlink direction on the second carrier 604. Further, the downlink allocation interval 622 is at an offset from the boundary of the subframe 606. The offset is equal to at least time required to process resource allocation information received in resource allocation region 634 of the scheduling interval 616 of the first carrier 602.

The downlink allocation interval 622 consists of multiple TTIs (e.g., 10 TTIs). Each TTI carries one HARQ process, where each HARQ process carries one HARQ packet. That is, multiple HARQ processes are time division multiplexed in each downlink allocation interval 622. Multiple HARQ processes may be frequency division multiplexed in one TTI in addition to time division multiplexing of HARQ processes in each downlink allocation interval 622.

In the present invention, two types of HARQ processes (i.e., first type of HARQ process and second type of HARQ process) are defined for transmitting HARQ packet. Retransmission interval of the first type of HARQ process is similar to the retransmission interval of the second type of HARQ process. In case of asynchronous transmission, retransmission interval referred herein is a minimum retransmission interval. Both the first type of HARQ process and the second type of HARQ process have a retransmission interval of 1 ms.

Method of retransmission associated with the first type of HARQ process is different from method of retransmission associated with the second type of HARQ process. Also, the TTIs reserved for transmission of HARQ packets associated with the first type of HARQ process are different from the TTIs reserved for transmission of HARQ packets associated with the second type of HARQ process. The downlink allocation interval 622 is divided into a first partition 624 and a second partition 626. The first partition 624 includes a first set of contiguous transmit time intervals (TTIs) which corresponds to first type of HARQ process and the second partition 626 includes a second set of contiguous transmit time intervals (TTIs) which correspond to second type of HARQ process. For example, the first set of contiguous TTIs contains five TTIs and the second set of TTIs contains five TTIs. The size of the first partition of the downlink allocation interval 622 is equal to number of TTIs in the downlink allocation interval 622 minus the pre-determined offset (T1) minus the offset minus time duration ($T_{PDCCH}$) of the resource allocation control region 634, where the offset is the time duration between the start of the uplink allocation interval 322 from the end of the control region 310 in the first carrier 302. In one exemplary implementation, the value of T1+offset+$T_{PDCCH}$ is quantized to TTI boundary. For example, if the downlink allocation interval 622 consists of ten TTIs, the size of the first partition 324 is equal to 10−(T1+offset+$T_{PDCCH}$)=5 slots TTIs and size of the second partition 326 is equal to T1+offset+$T_{PDCCH}$=5 TTIs.

Both the first partition 624 and the second partition 626 start at TTI boundary of the downlink allocation interval 622. The downlink allocation interval 622 is divided into a first partition 624 and a second partition 626. The first partition 624 includes a first set of contiguous transmit time intervals (TTIs) and the second partition 626 includes a second set of contiguous transmit time intervals (TTIs). The first TTI in the first set of contiguous TTIs starts at the beginning of the downlink allocation interval. The first TTI in the second set of contiguous TTIs is a TTI in the downlink allocation interval 622 which is at a pre-determined offset (T1) from the resource allocation control region 634 in a next scheduling interval 616 of the first downlink carrier 602B. The pre-determined offset (T1) is equal to at least time required for process a HARQ packet and time required to prepare HARQ feedback information. The pre-determined offset (T1) may also include time corresponding to timing advance. It can be noted that, maximum timing advance supported by the asymmetric multicarrier communication network system 100 may be considered to compute the pre-determined offset. The pre-determined offset (T1) is quantized to a TTI boundary.

As shown in FIG. 6a, the base station 102 transmits resource allocation information to the mobile station 104 in the resource allocation control region 610 in the scheduling interval 616 on the first downlink carrier 602B. For example, the base station 102 transmits an S-PDCCH carrying the resource allocation information in a PDCCH region of the subframe 606 on the first carrier 602. The resource allocation information indicates resources and TTI in the downlink allocation interval 622 for receiving a HARQ packet on the second carrier 604 by the mobile station 104. The TTI indicated in the resource allocation information corresponds to one of the first partition 624 and the second partition 626 of the downlink allocation interval 622.

Consider that, the TTI corresponds to the first partition 624 of the downlink allocation interval 622. As shown in FIG. 6b, the base station 102 transmits a HARQ packet (P1) corresponding to a first HARQ packet transmission ($1^{st}$Tx) to the mobile station 104 in the TTI of the first partition 624 of the downlink allocation interval 622 according to a first type of HARQ process (Type A). However, if the TTI corresponds to the second partition 626 of the downlink allocation interval 622, the base station 102 transmits a HARQ packet (P2) corresponding to a first HARQ packet transmission ($1^{st}$Tx) to the mobile station 104 in the TTI of the second partition 626 of the downlink allocation interval 622 according to a second type of HARQ process (Type B).

For the first type of HARQ process, consider that the mobile station 104 have not received the HARQ packet (P1) transmitted by the base station 102 in the TTI of the first partition 624 of the downlink allocation interval 622. As shown in FIG. 6c, the mobile station 104 transmits HARQ feedback information in a Physical Uplink Control Channel (PUCCH) to the base station 102 in a HARQ feedback region 636 of the next subframe 606 (F2) on the first uplink carrier 602A. Consider that, the HARQ feedback information indicates negative acknowledgement (NACK) of the first HARQ packet transmission ($1^{st}$Tx) in the TTI of the first partition 624.

For the second type of HARQ process, consider that the mobile station 104 have also not received the HARQ packet (P2) transmitted by the base station 102 in the TTI of the second partition 626 of the downlink allocation interval 622. As shown in FIG. 6c, the mobile station 104 transmits HARQ feedback information in a PUCCH to the base station 102 in a HARQ feedback region 636 of the next subframe 606 (F2) on the first uplink carrier 602A. Consider that, the HARQ feedback information indicates negative acknowledgement (NACK) of the first HARQ packet transmission ($1^{st}$Tx) in the TTI of the second partition 626.

For first type of HARQ process, as AHARHARQ the HARQ feedback information indicates negative acknowledgement (NACK) of the HARQ packet (P1) transmitted in the first partition 624, the base station 102 performs a second HARQ packet transmission ($2^{nd}$Tx), as shown in FIG. 6d. That is, the base station 102 transmits the HARQ packet (P1) corresponding to the second HARQ packet transmission ($2^{nd}$Tx) in the TTI of the first partition 624 in the subsequent downlink allocation interval 622 on the second carrier 604 based on the resources allocated after the reception of the HARQ feedback information as shown in FIG. 6d. The base station 102 allocates resources for the second HARQ packet transmission ($2^{nd}$Tx) after receiving the HARQ feedback information for the first HARQ packet transmission ($1^{st}$Tx). The base station 102 transmits the second packet HARQ transmission ($2^{nd}$Tx) after allocating and transmitting the resources for the second HARQ packet transmission ($2^{nd}$Tx).

For second type of HARQ process, as AHARHARQ the HARQ feedback information indicates negative acknowledgement (NACK) of the HARQ packet (P2) transmitted in the first partition 624, the base station 102 performs a second HARQ packet transmission ($2^{nd}$Tx), as shown in FIG. 6d. The base station 102 transmits the HARQ packet (P2) corresponding to a second HARQ packet transmission ($2^{nd}$Tx) to the mobile station 104 in the TTI of the second partition 626 of the next downlink allocation interval 622 on the second carrier 604. The base station 102 allocates and transmits resources for the second HARQ packet transmission ($2^{nd}$Tx) before receiving and processing the HARQ feedback information for the first HARQ packet transmission ($1^{st}$Tx). However, the base station 102 transmits the HARQ packet corresponding to the second HARQ packet transmission ($2^{nd}$Tx) after receiving the HARQ feedback information for the first HARQ packet transmission ($1^{st}$Tx).

For the first type of HARQ process, consider that the mobile station 104 has received the HARQ packet (P1) corresponding to the second HARQ packet transmission ($2^{nd}$Tx) transmitted in the TTI of the first partition 624 on the second carrier 604. In such case, the mobile station 104 transmits HARQ feedback information in the HARQ feedback region 636 of the subframe 606 (F4) on the first uplink carrier 602A where the HARQ feedback information indicates positive acknowledgement (ACK) of the second HARQ packet transmission ($2^{nd}$Tx) performed in the first partition 624 of the downlink allocation interval 622 as illustrated in FIG. 6e. It can be noted that the base station 102 does not allocate resources for the third HARQ packet transmission ($3^{rd}$Tx) after receiving the HARQ feedback information for the second HARQ packet transmission ($2^{nd}$Tx) as the second HARQ packet transmission ($2^{nd}$Tx) is successfully received by the mobile station 104. Also, the base station 102 does not transmit the HARQ packet (P1) corresponding to the third HARQ packet transmission ($3^{rd}$Tx) in a TTI of the first partition 624 of the downlink allocation interval 622 as shown in FIG. 6f.

In case of second type of HARQ process, consider that the mobile station 104 has received the HARQ packet (P2) corresponding to the second HARQ packet transmission transmitted in the TTI of the second partition 626 on the second downlink carrier 604. In such case, the mobile station 104 transmits HARQ feedback information in the HARQ feedback region 636 of the subframe 606 (F4) on the first uplink carrier 602 where the HARQ feedback information indicates positive acknowledgement (ACK) of the second HARQ packet transmission ($2^{nd}$Tx) performed in the second partition 626 of the downlink allocation interval 622. However, since the HARQ feedback information for the first HARQ packet transmission ($1^{st}$Tx) indicated negative acknowledgement (NACK), the base station 102 allocates and transmits resources for the third HARQ packet transmission ($3^{rd}$Tx). In the resources allocated for the third HARQ packet transmission ($3^{rd}$Tx), the base station 102 may transmit the third HARQ packet transmission ($3^{rd}$Tx) to the mobile station 104 in the TTI of the second partition 626 of the next downlink allocation interval 622 on the second carrier 604 based on the resources allocated for the third HARQ packet transmission ($3^{rd}$Tx) as shown in FIG. 6f. Alternatively, the base station 102 may not transmit anything in the resources allocated for the third HARQ packet transmission ($3^{rd}$Tx). Alternatively, the base station 102 may transmit a new HARQ packet in the resources allocated for the third HARQ packet transmission ($3^{rd}$Tx).

FIG. 7 is a block diagram of the base station 102 showing various components for implementing embodiments of the present subject matter. In FIG. 7, the base station 102 includes a processor 702, a memory 704, a read only memory (ROM) 706, a transceiver 708, and a bus 710.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 and the ROM 706 may be volatile memory and non-volatile memory. The memory 704 includes a HARQ operation module 712 for transmitting HARQ packets and receiving HARQ feedback information according to the first and second type of downlink HARQ processes or receiving HARQ packets and transmitting HARQ feedback according to the first and second type of UL HARQ processes, and a resource allocation module 714 for allocating resources and TTIs for transmission of the HARQ packets, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. Although, the memory 704 containing the HARQ operation module 712 and the resource allocation module 714 is shown as a separate entity, one skilled in the art may understand that in some implementations, the memory 704 containing the HARQ operation module 712 and the resource allocation module 714 may be a part of the processor 702.

Embodiments of the present subject matter may be implemented in conjunction with modules, including functions, procedures, data structures, and application programs, for performing tasks, or defining abstract data types or low-level hardware contexts. The HARQ operation module 712 and the resource allocation module 714 may be stored in the form of machine-readable instructions on any of the above-mentioned storage media and may be executed by the processor 702. For example, a computer program may include machine-readable instructions which when executed by the processor 702, may cause the processor 702 to transmit HARQ packets and receive HARQ feedback information according to first and second type of downlink HARQ processes or to receive HARQ packets and transmit HARQ feedback information according to first and second type of uplink HARQ processes and to allocate resources and TTIs for transmission of the HARQ packets, according to the teachings and herein described embodiments of the present subject matter. In one embodiment, the program may be included on a compact disk-read only memory (CD-ROM) and loaded from the CD-ROM to a hard drive in the non-volatile memory.

The transceiver 708 may be capable of transmitting resource allocation information, transmitting/receiving HARQ packets and HARQ feedback information. The bus 710 acts as interconnect between various components of the base station 102.

FIG. 8 is a block diagram of a mobile station 104 showing various components for implementing embodiments of the present subject matter. In FIG. 8, the mobile station 104 includes a processor 802, memory 804, a read only memory (ROM) 806, a transceiver 808, a bus 810, a display 812, an input device 814, and a cursor control 816.

The processor 802, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 802 may also include embedded controllers, such as generic or programmable logic devices or arrays, application specific integrated circuits, single-chip computers, smart cards, and the like.

The memory 804 and the ROM 806 may be volatile memory and non-volatile memory. The memory 704 includes a HARQ operation module 818 for transmitting HARQ packets and receiving HARQ feedback information according to first and second type of uplink HARQ processes, for receiving HARQ packets and transmitting HARQ feedback information according to first and second type of downlink HARQ processes, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. Although, the memory 704 containing the HARQ operation module 712 and the resource allocation module 714 is shown as a separate entity, one skilled in the art may understand that in some implementations, the memory 704 containing the HARQ operation module 712 and the resource allocation module 714 may be a part of the processor 702.

Embodiments of the present subject matter may be implemented in conjunction with modules, including functions, procedures, data structures, and application programs, for performing tasks, or defining abstract data types or low-level hardware contexts. The HARQ operation module 818 may be stored in the form of machine-readable instructions on any of the above-mentioned storage media and may be executed by the processor 802. For example, a computer program may include machine-readable instructions, that when executed by the processor 802, cause the processor 802 to transmit HARQ packet and receive HARQ feedback information according to first and second type of uplink HARQ processes or to receive HARQ packets and transmit HARQ feedback information according to first and second type of downlink HARQ processes, according to the teachings and herein described embodiments of the present subject matter. In one embodiment, the computer program may be included on a compact disk-read only memory (CD-ROM) and loaded from the CD-ROM to a hard drive in the non-volatile memory.

The transceiver 808 may be capable of transmitting/receiving HARQ packet and HARQ feedback information to/from the base station 102. The bus 810 acts as interconnect between various components of the mobile station 104. The components such as the display 812, the input device 814, and the cursor control 816 are well known to the person skilled in the art and hence the explanation is thereof omitted.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module (e.g., HARQ operation module 712 and HARQ operation module 818) for performing the aforementioned functions. Software is storable in a memory unit and executed by the processor. Various means widely known to those skilled in the art can be used as the memory unit or the processor.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method to perform an uplink hybrid automatic repeat request (HARQ) operation in an asymmetric multicarrier communication network environment, comprising:
   receiving, by a mobile station, resource allocation information from a base station in a resource allocation control region in a scheduling interval of a first carrier, wherein the resource allocation information indicates resources and a transmit time interval of an uplink allocation interval on a second carrier being asymmetric with the first carrier to transmit a HARQ packet on the second carrier, the uplink allocation interval is a subframe and comprises a first partition and a second partition, and the first partition comprises contiguous transmit time intervals and the second partition comprises contiguous transmit time intervals;
   generating the HARQ packet;
   transmitting the HARQ packet to the base station in the transmit time interval using the resources based on a first type of HARQ process if the transmit time interval is included in the first partition; and
   transmitting the HARQ packet to the base station in the transmit time interval using the resources based on a second type of HARQ process if the transmit time interval is included in the second partition.

2. The method of claim 1, wherein a first transmit time interval in the first partition starts at a beginning of the uplink allocation interval.

3. The method of claim 1, wherein a first transmit time interval in the second partition is a transmit time interval in the uplink allocation interval that is at a pre-determined offset from a resource allocation control region in a next scheduling interval of the first carrier.

4. The method of claim 1, wherein transmitting the HARQ packet to the base station based on the first type of HARQ process further comprises:
   receiving HARQ feedback information corresponding to N-1$^{th}$ HARQ packet transmission from the base station in a HARQ feedback control region on the first carrier;
   receiving resource allocation information for N$^{th}$ HARQ packet transmission from the base station in a resource allocation control region on the first carrier if the received HARQ feedback information indicates negative acknowledgement of the N-1$^{th}$ HARQ packet transmission and a maximum number of HARQ packet transmissions is greater than N-1, wherein the resource allocation information indicates resources allocated for the $N^{th}$ HARQ packet transmission; and transmitting the HARQ packet corresponding to the $N^{th}$ HARQ packet transmission to the base station in a transmit time interval of the uplink allocation interval on the second carrier using the resources allocated for the $N^{th}$ HARQ packet transmission.

5. The method of claim 1, wherein transmitting the HARQ packet to the base station based on the second type of HARQ process further comprises:

transmitting the HARQ packet corresponding to $N-1^{th}$ HARQ packet transmission to the base station in a transmit time interval of a second partition of a subsequent uplink allocation interval on the second carrier prior to reception of HARQ feedback information corresponding to $N-2^{th}$ HARQ packet transmission; and receiving HARQ feedback information corresponding to the $N-2^{th}$ HARQ packet transmission from the base station in a HARQ feedback control region on the first carrier.

6. The method of claim 5, wherein receiving the HARQ feedback information corresponding to the $N-2^{th}$ HARQ packet transmission further comprises:

transmitting the HARQ packet corresponding to $N^{th}$ HARQ packet transmission to the base station in a transmit time interval of a second partition in a subsequent uplink allocation interval on the second carrier if the received HARQ feedback information indicates negative acknowledgment of the $N-2^{th}$ HARQ packet transmission and if a maximum number of HARQ packet transmissions is greater than N-1.

7. The method of claim 6, wherein the transmit time interval for the $N^{th}$ HARQ packet transmission is located before a HARQ feedback control region in which the HARQ feedback information for the $N-1^{th}$ HARQ packet transmission is received.

8. The method of claim 6, wherein transmitting the HARQ packet corresponding to $N^{th}$ HARQ packet transmission comprises:

receiving resource allocation information for the $N^{th}$ HARQ packet transmission from the base station in a resource allocation control region on the first carrier if the received HARQ feedback information indicates negative acknowledgement of the $N-2^{th}$ HARQ packet transmission and the maximum number of HARQ packet transmissions is greater than N-1, wherein the resource allocation information indicates resources allocated for the $N^{th}$ HARQ packet transmission; and transmitting the HARQ packet corresponding to the $N^{th}$ HARQ packet transmission to the base station in a transmit time interval of the second partition in the subsequent uplink allocation interval on the second carrier using the resources allocated for the $N^{th}$ HARQ packet transmission.

9. The method of claim 8, wherein the resource allocation control region carrying the resource allocation information for the $N^{th}$ HARQ packet transmission is located at a same time or after the HARQ feedback control region in which the HARQ feedback information for the $N-2^{th}$ HARQ packet transmission is received.

10. An apparatus comprising:
a processor; and
a memory coupled to the processor, wherein the memory includes a hybrid automatic repeat request (HARQ) operation module configured to:

receive resource allocation information from a base station in a resource allocation control region in a scheduling interval of a first carrier, wherein the resource allocation information indicates resources and a transmit time interval of an uplink allocation interval on a second carrier being asymmetric with the first carrier for transmitting a HARQ packet on the second carrier, the uplink allocation interval is a subframe and comprises a first partition and a second partition, and the first partition comprises contiguous transmit time intervals and the second partition comprises contiguous transmit time intervals;

generate the HARQ packet;

transmit the HARQ packet to the base station in the transmit time interval using on the resources based on a first type of HARQ process if the transmit time interval is included in the first partition; and transmit the HARQ packet to the base station in the transmit time interval using the resources based on a second type of HARQ process if the transmit time interval is included in the second partition.

11. The apparatus of claim 10, wherein the HARQ operation module is further configured to:

transmit the HARQ packet corresponding to $N-1^{th}$ HARQ packet transmission to the base station in a transmit time interval of a second partition of a subsequent uplink allocation interval on the second carrier prior to reception of HARQ feedback information corresponding to $N-2^{th}$ HARQ packet transmission; and receive HARQ feedback information corresponding to the $N-2^{th}$ HARQ packet transmission from the base station in a HARQ feedback control region on the first carrier.

12. The apparatus of claim 11, wherein the HARQ operation module is further configured to:

transmit the HARQ packet corresponding to $N^{th}$ HARQ packet transmission to the base station in a transmit time interval of a second partition in a subsequent uplink allocation interval on the second carrier if the received HARQ feedback information indicates negative acknowledgment of the $N-2^{th}$ HARQ packet transmission and if a maximum number of HARQ packet transmissions is greater than N-1, wherein the transmit time interval for the $N^{th}$ HARQ packet transmission is located before the HARQ feedback control region in which the HARQ feedback information for the $N-1^{th}$ HARQ packet transmission is received.

13. The apparatus of claim 11, wherein the HARQ operation module is further configured to:

receive resource allocation information for the $N^{th}$ HARQ packet transmission from the base station in a resource allocation control region on the first carrier if the received HARQ feedback information indicates negative acknowledgement of the $N-2^{th}$ HARQ packet transmission and the maximum number of HARQ packet transmissions is greater than N-1, wherein the resource allocation information indicates resources allocated for the $N^{th}$ HARQ packet transmission, and wherein the resource allocation control region carrying the resource allocation information for the $N^{th}$ HARQ packet transmission is located at a same time or after the HARQ feedback control region in which the HARQ feedback information for the $N-2^{th}$ HARQ packet transmission is received; and transmit the HARQ packet corresponding to the $N^{th}$ HARQ packet transmission to the base station in a transmit time interval of the second partition in the subsequent uplink allocation interval on the second carrier using the resources allocated for the $N^{th}$ HARQ packet transmission.

14. A method to perform a downlink hybrid automatic repeat request (HARQ) operation in an asymmetric multi-carrier communication network environment, comprising:
    generating a HARQ packet intended for a mobile station by a base station;
    transmitting resource allocation information to the mobile station in a resource allocation region of a scheduling interval on a first carrier, wherein the resource allocation information indicates resources and a transmit time interval of a downlink allocation interval on a second carrier being asymmetric with the first carrier to transmit the HARQ packet on the second carrier, the downlink allocation interval is a subframe and comprises a first partition and a second partition, and the first partition comprises contiguous transmit time intervals and the second partition comprises contiguous transmit time intervals;
    transmitting the HARQ packet to the mobile station in the transmit time interval using the resources based on a first type of HARQ process if the transmit time interval is included in the first partition; and
    transmitting the HARQ packet to the mobile station in the transmit time interval using the resources based on a second type of HARQ process if the transmit time interval is included in the second partition.

15. The method of claim 14, wherein a first transmit time interval in the first partition starts at a beginning of the downlink allocation interval.

16. The method of claim 14, wherein a first transmit time interval in the second partition is a transmit time interval in the downlink allocation interval that is at a pre-determined offset from a resource allocation control region of a subsequent downlink allocation interval.

17. The method of claim 14, wherein transmitting the HARQ packet to the mobile station based on the first type of HARQ process further comprises:
    receiving HARQ feedback information corresponding to $N-1^{th}$ HARQ packet transmission from the mobile station in a HARQ packet control region on the first carrier;
    allocating resources for $N-1^{th}$ HARQ packet transmission in a subsequent downlink allocation interval;
    transmitting resource allocation information indicating the resources allocated for the $N-1^{th}$ HARQ packet transmission to the mobile station in a resource allocation control region on the first carrier if the received HARQ feedback information indicates negative acknowledgment of the $N-1^{th}$ HARQ packet transmission and a maximum number of HARQ packet transmissions is greater than N-1; and
    transmitting the I-ARQ packet corresponding to $N^{th}$ HARQ packet transmission to the mobile station in a Transmit Time Interval (TTI) corresponding to a first partition of a subsequent downlink allocation interval on the second carrier using the resources allocated for the $N^{th}$ HARQ packet transmission.

18. The method of claim 14, wherein transmitting the HARQ packet to the mobile station based on the second type of HARQ process further comprises:
    allocating resources for $N-1^{th}$ HARQ packet transmission in the downlink allocation interval;
    transmitting resource allocation information indicating the resources allocated for the $N-1^{th}$ HARQ packet transmission to the mobile station in a resource allocation control region on the first carrier; and
    receiving HARQ feedback information associated with $N-2^{th}$ HARQ packet transmission from the mobile station in a HARQ feedback control region on the first carrier, wherein the resource allocation control region to indicate the resources allocated for the $N-1^{th}$ HARQ packet transmission is located before the HARQ feedback control region in which the HARQ feedback information for the $N-2^{th}$ HARQ packet transmission is received.

19. The method of claim 18, wherein receiving the HARQ feedback information associated with the $N-2^{th}$ HARQ packet transmission from the mobile station in the HARQ feedback control region on the first carrier further comprises:
    transmitting the HARQ packet corresponding to the $N-1^{th}$ HARQ packet transmission to the mobile station in a Transmit Time Interval (TTI) corresponding to a second partition of a subsequent downlink allocation interval on the second carrier using the resources allocated for the $N-1^{th}$ HARQ packet transmission if the received HARQ feedback information indicates negative acknowledgment of the $N-2^{th}$ HARQ packet transmission and a maximum number of HARQ packet transmissions is greater than N-1.

20. The method of claim 18, wherein receiving the HARQ feedback information associated with the $N-2^{th}$ HARQ packet transmission from the mobile station in the HARQ feedback control region on the first carrier further comprises:
    allocating resources for $N^{th}$ HARQ packet transmission in the downlink allocation interval if the received HARQ feedback information indicates negative acknowledgment of the $N-2^{th}$ HARQ packet transmission and a maximum number of HARQ packet transmissions is greater than N-1; and
    transmitting resource allocation information indicating the resources allocated for the $N^{th}$ HARQ packet transmission to the mobile station in the resource allocation control region on the first carrier.

21. The method of claim 18, wherein the resources allocated for the $N-1^{th}$ HARQ packet transmission comprises a set of parameters to transmit a new HARQ packet and a set of parameters to retransmit the HARQ packet.

22. The method of claim 21, wherein receiving the HARQ feedback information associated with the $N-2^{th}$ HARQ packet transmission from the mobile station in the HARQ feedback control region on the first carrier further comprises:
    terminating an ongoing downlink HARQ operation if the HARQ feedback information received after transmitting the resource allocation information for the $N-1^{th}$ HARQ packet transmission indicates a positive acknowledgement of the $N-2^{th}$ HARQ packet transmission; and
    transmitting a new HARQ packet corresponding to a new downlink HARQ operation to the mobile station in a Transmit Time Interval (TTI) corresponding to a second partition of a subsequent downlink allocation interval on the second carrier using the set of parameters to transmit the new HARQ packet.

23. The method of claim 21, wherein receiving the HARQ feedback information associated with the $N-2^{th}$ HARQ packet transmission from the mobile station in the HARQ feedback control region on the first carrier comprises:

terminating an ongoing HARQ process operation if the HARQ feedback information received after transmitting the resource allocation information for the N-1$^{th}$ HARQ packet transmission indicates a positive acknowledgement of the N-2$^{th}$ HARQ packet transmission; and transmitting the HARQ packet corresponding to the N-1$^{th}$ HARQ packet transmission associated with a terminated downlink HARQ operation to the mobile station in a Transmit Time Interval (TTI) corresponding to a second partition of a subsequent downlink allocation interval on the second carrier using the set of parameters to retransmit the HARQ packet.

24. An apparatus comprising:
a resource allocation module configured to transmit resource allocation information to a mobile station in a resource allocation region of a scheduling interval on a first carrier, wherein the resource allocation information indicates resources and a transmit time interval of a downlink allocation interval on a second carrier being asymmetric with the first carrier for receiving a hybrid automatic repeat request (HARQ) packet by the mobile station, the downlink allocation interval is a subframe and comprises a first partition and a second partition, and the first partition comprises contiguous transmit time intervals and the second partition comprises contiguous transmit time intervals; and a HARQ operation module configured to:
generate a HARQ packet intended for the mobile station;
transmit the HARQ packet to the mobile station in the transmit time interval using the resources based on a first type of HARQ process if the transmit time interval is included in the first partition; and
transmit the HARQ packet to the mobile station in the transmit time interval using the resources based on a second type of HARQ process if the transmit time interval is included in the second partition.

25. The apparatus of claim 24, wherein the resource allocation module is configured to:
allocate resources for N-1$^{th}$ HARQ packet transmission in the downlink allocation interval; and
transmit resource allocation information indicating the resources allocated for the N-1$^{th}$ HARQ packet transmission to the mobile station in a resource allocation control region on the first carrier, wherein the resource allocation control region to indicate the resources allocated for the N-1$^{th}$ HARQ packet transmission is located before a HARQ feedback control region in which HARQ feedback information for N-2$^{th}$ transmission is going to be received.

26. The apparatus of claim 25, wherein the HARQ operation module is configured to receive HARQ feedback information associated with a N-2$^{th}$ HARQ packet transmission from the mobile station in a HARQ feedback control region on the first carrier.

27. The apparatus of claim 26, wherein the HARQ operation module is configured to:
transmit the HARQ packet corresponding to the N-1$^{th}$ HARQ packet transmission to the mobile station in a Transmit Time Interval (TTI) corresponding to a second partition of a subsequent downlink allocation interval on the second carrier using the resources allocated for the N-1$^{th}$ HARQ packet transmission if the received HARQ feedback information indicates a negative acknowledgment of the N-2$^{th}$ HARQ packet transmission and a maximum number of HARQ packet transmissions is greater than N-1.

28. The apparatus of claim 26, wherein the resource allocation module is configured to:
allocate resources for N$^{th}$ HARQ packet transmission in the downlink allocation interval if the received HARQ feedback information indicates a negative acknowledgment of the N-2$^{th}$ HARQ packet transmission and a maximum number of HARQ packet transmissions is greater than N-1; and
transmit resource allocation information indicating the resources allocated for the N$^{th}$ HARQ packet transmission to the mobile station in the resource allocation control region on the first carrier.

29. The apparatus of claim 26, wherein the HARQ operation module is configured to:
terminate an ongoing downlink HARQ operation if the HARQ feedback information received after transmitting the resource allocation information for the N-1$^{th}$ HARQ packet transmission indicates a positive acknowledgement of the N-2$^{th}$ HARQ packet transmission; and
transmit a new HARQ packet to the mobile station in a Transmit Time Interval (TTI) corresponding to a second partition of a subsequent downlink allocation interval on the second carrier using the resources allocated for the N-1$^{th}$ HARQ packet transmission.

30. The apparatus of claim 26, wherein the HARQ operation module is configured to:
transmit the ongoing downlink HARQ operation if the HARQ feedback information received after transmitting the resource allocation information for the N-1$^{th}$ HARQ packet transmission indicates a positive acknowledgement of the N-2$^{th}$ HARQ packet transmission; and
transmit the HARQ packet corresponding to the N-1$^{th}$ HARQ packet transmission to the mobile station in a Transmit Time Interval (TTI) corresponding to a second partition of a subsequent downlink allocation interval on the second carrier using the resources allocated for the N-1$^{th}$ HARQ packet transmission.

* * * * *